US012231685B2

(12) United States Patent
Chiang et al.

(10) Patent No.: US 12,231,685 B2
(45) Date of Patent: Feb. 18, 2025

(54) METHODS AND APPARATUS FOR SECONDARY TRANSFORM SIGNALING IN VIDEO CODING

(71) Applicant: HFI Innovation Inc., Zhubei (TW)

(72) Inventors: Man-Shu Chiang, Hsinchu (TW); Chih-Wei Hsu, Hsinchu (TW); Tzu-Der Chuang, Hsinchu (TW); Ching-Yeh Chen, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 17/904,836

(22) PCT Filed: Feb. 24, 2021

(86) PCT No.: PCT/CN2021/077654
§ 371 (c)(1),
(2) Date: Aug. 23, 2022

(87) PCT Pub. No.: WO2021/169994
PCT Pub. Date: Sep. 2, 2021

(65) Prior Publication Data
US 2023/0130131 A1 Apr. 27, 2023

Related U.S. Application Data

(60) Provisional application No. 62/988,423, filed on Mar. 12, 2020, provisional application No. 62/981,066, filed on Feb. 25, 2020.

(51) Int. Cl.
*H04N 19/60* (2014.01)
*H04N 19/176* (2014.01)
(Continued)

(52) U.S. Cl.
CPC ............ *H04N 19/60* (2014.11); *H04N 19/176* (2014.11); *H04N 19/46* (2014.11); *H04N 19/70* (2014.11)

(58) Field of Classification Search
CPC ...... H04N 19/176; H04N 19/46; H04N 19/70; H04N 19/60
See application file for complete search history.

(56) References Cited

U.S. PATENT DOCUMENTS

| 9,998,741 B2 | 6/2018 | Kirchhoffer et al. |
| 10,674,146 B2 | 6/2020 | Heo et al. |

(Continued)

FOREIGN PATENT DOCUMENTS

| CN | 109076230 A | 12/2018 |
| EP | 4 109 902 A1 | 12/2022 |

(Continued)

OTHER PUBLICATIONS

Bross et al., ("Versatile Video Coding (Draft 8)", Joint Video Experts Team (JVET) of ITU-T SG 16 WP 3 and ISO/IEC JTC 1/SC 29/ WG 11, 17th Meeting: Brussels, BE, Jan. 2020) (Year: 2020).*

(Continued)

*Primary Examiner* — On S Mung
(74) *Attorney, Agent, or Firm* — McClure, Qualey & Rodack, LLP

(57) ABSTRACT

A method for video encoding and decoding using Low-Frequency Non-Separable Transform (LFNST) mode and apparatus thereof are disclosed. The input data correspond to primary transformed data at the encoder and the input data correspond to coded data of the current CU at the decoder. A CU is partitioned into one or more transform blocks (TBs). An LFNST syntax is determined at an encoder side or at a decoder side if one or more conditions are satisfied. The LFNST syntax indicates whether the LFNST mode is (Continued)

applied to the current CU and/or which LFNST kernel is applied when the LFNST mode is applied. The conditions comprise the CBF indications for the target TBs being false. The current CU is encoded or decoded according to the LFNST mode as indicated by the LFNST syntax.

14 Claims, 4 Drawing Sheets

(51) Int. Cl.
*H04N 19/46* (2014.01)
*H04N 19/70* (2014.01)

(56) References Cited

U.S. PATENT DOCUMENTS

| | | |
|---|---|---|
| 11,496,385 B2 | 11/2022 | Seregin |
| 2020/0177889 A1 | 6/2020 | Kim et al. |

FOREIGN PATENT DOCUMENTS

| | | |
|---|---|---|
| TW | 201742457 A | 12/2017 |
| WO | 2017/057953 A1 | 4/2017 |
| WO | 2017/192705 A1 | 11/2017 |
| WO | 2018/174402 A1 | 9/2018 |

OTHER PUBLICATIONS

International Search Report and Written Opinion dated May 20, 2021, issued in application No. PCT/CN2021/077654.

Kidani, Y., et al.; "CE6-related: Signalling of Low Frequency Non-Separable Transform;" Joint Video Experts Team (JVET) of ITU-T SG 16 WP 3 and ISO/IEC JTC 1/SC 29/WG 11; Jul. 2019; pp. 1-8.

Chiang, M., et al.; "CE6-related: Constraint and simplification for LFNST signalling;" Joint Video Experts Team (JVET) of ITU-T SG 16 WP 3 and ISO/IEC JTC 1/SC 29/WG 11; Jul. 2019; pp. 1-4.

Chinese language office action dated May 10, 2022, issued in application No. TW 110106681.

Extended European Search Report dated Feb. 28, 2024, issued in application No. EP 21759956.2.

Tsukuba, T., et al.; "On Interaction of LFNST and Transform skip;" Joint Video Experts Team (JVET) of ITU-T SG 16 WP 3 and ISO/IEC JTC 1/SC 29/WG 11; Dec. 2019; pp. 1-6.

Chuang, T-D., et al.; "LFNST complexity reduction;" Joint Video Experts Team (JVET) of ITU-T SG 16 WP 3 and ISO/IEC JTC 1/SC 29/WG 11; Apr. 2020; pp. 1-4.

Koo, M., et al.; "Alternative methods of LFNST index signaling;" Joint Video Experts Team (JVET) of ITU-T SG 16 WP 3 and ISO/IEC JTC 1/SC 29/WG 11; Apr. 2020; pp. 1-11.

Chinese language office action dated Jul. 26, 2024, issued in application No. CN 202180013034.2.

\* cited by examiner

METHODS AND APPARATUS FOR SECONDARY TRANSFORM SIGNALING IN VIDEO CODING

CROSS REFERENCE TO RELATED APPLICATIONS

The present invention claims priority to U.S. Provisional Patent Application Ser. No. 62/981,066, filed on Feb. 25, 2020 and U.S. Provisional Patent Application Ser. No. 62/988,423, filed on Mar. 12, 2020. The U.S. Provisional Patent Applications are hereby incorporated by reference in their entireties.

FIELD OF THE INVENTION

The present invention relates to video coding. In particular, the present invention discloses method and apparatus for Secondary Transform signaling to improve performance.

BACKGROUND AND RELATED ART

High-Efficiency Video Coding (HEVC) is a new international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block, and each CU can be recursively split into four smaller CUs until the predefined minimum size is reached. Each CU contains one or multiple prediction units (PUs).

To achieve the best coding efficiency of hybrid coding architecture in HEVC, there are two kinds of prediction modes for each PU, which are intra prediction and inter prediction. For intra prediction modes, the spatial neighboring reconstructed pixels can be used to generate the directional predictions. There are up to 35 directions in HEVC. For inter prediction modes, the temporal reconstructed reference frames can be used to generate motion compensated predictions. There are three different modes, including Skip, Merge and Inter Advanced Motion Vector Prediction (AMVP) modes.

Transform Process

After prediction, the predicted residues for one CU are divided into transform units (TUs) and coded using transform and quantization. Like many other precedent standards, HEVC adopts Discrete Cosine Transform type II (DCT-II) as its core transform (primary transform) because it has a strong "energy compaction" property. In order to improve transform, Discrete Sine Transform (DST) was introduced to be used alternatively with DCT for oblique intra modes. For inter-predicted residue, DCT-II is the only transform used in current HEVC. However, the DCT-II is not the optimal transform for all cases. Discrete Sine Transform type VII (DST-VII) and Discrete Cosine Transform type IVIII (DCT-VIII) are proposed to replace DCT-II in some cases. Also multiple transform selection (MTS) scheme is used for residual coding for both intra and inter coded blocks. It utilizes multiple selected transforms from the DCT/DST families other than the current transforms in HEVC. The newly introduced transform matrices is DCT-VIII. In VVC, Multiple transform selection (MTS) for core transform is described as follows.

In addition to DCT-II which has been employed in HEVC, a Multiple Transform Selection (MTS) scheme is used for residual coding inter and/or intra coded blocks. It uses multiple selected transforms from the DCT8 (DCT-VIII)/DST7(DST-VII). The newly introduced transform matrices are DST-VII and DCT-VIII. The following table shows the basis functions of the selected DST/DCT.

TABLE 1

Transform basis functions of DCT-II/VIII and DSTVII for N-point input

| Transform Type | Basis function Ti(j), i, j = 0, 1, ..., N − 1 |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ where, $\omega_0 = \begin{cases} \sqrt{\dfrac{2}{N}} & i = 0 \\ 1 & i \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

In order to keep the orthogonality of the transform matrix, the transform matrices are quantized more accurately than the transform matrices in HEVC. To keep the intermediate values of the transformed coefficients within the 16-bit range, after horizontal and after vertical transform, all the coefficients are kept in 10-bit.

In order to control the MTS scheme, separate enabling flags are specified at the SPS level for intra and inter mode, respectively. When MTS is enabled at SPS, a CU level index is signaled to indicate the transform mode indicating the transform types for the horizontal and vertical directions for the current CU. Here, MTS is applied only for luma. The MTS CU level index (i.e., mts_idx) can be signaled when both width and height are smaller than or equal to 32 and CBF flag is equal to one.

If MTS CU index is equal to zero, then DCT2 is applied in both directions. However, if MTS CU index is larger than zero, the transform types for the horizontal and vertical directions are specified in Table 2.

TABLE 2

Transform and signaling mapping table

| | Intra/inter | |
|---|---|---|
| mts_idx | Horizontal | Vertical |
| 0 | DCT2 | |
| 1 | DST7 | DST7 |
| 2 | DCT8 | DST7 |
| 3 | DST7 | DCT8 |
| 4 | DCT8 | DCT8 |

To reduce the complexity of large size DST-7 and DCT-8, high frequency transform coefficients are zeroed out for the DST-7 and DCT-8 blocks with size (width or height, or both width and height) equal to 32. Only the coefficients within the 16×16 lower-frequency region are retained.

Low-Frequency Non-Separable Transform (LFNST)

In VVC, forward LFNST (low-frequency non-separable transform) 120, which is known as reduced secondary transform, is applied between forward primary transform 110 and quantization 130 (at encoder) and inverse LFNST 150 is applied between de-quantization 140 and inverse primary transform 160 (at decoder side) as shown in FIG. 1. In LFNST, a 4×4 non-separable transform or 8×8 non-separable transform is applied according to the block size. For example, 4×4 LFNST is applied for small blocks (i.e., min (width, height)<8) and 8×8 LFNST is applied for larger blocks (i.e., min (width, height)>4). In FIG. 1, the dot filled area 122 corresponds to 16 input coefficients for 4×4 forward LFNST or 48 input coefficients for 8×8 forward LFNST. The dot filled area 152 corresponds to 8 or 16 input coefficients for 4×4 inverse LFNST or 8 or 16 input coefficients for 8×8 inverse LFNST. The input to the forward primary transform is prediction residuals and the output from the inverse primary transform is the reconstructed residual in this case.

Application of a non-separable transform, which is being used in LFNST, is described in the following example. To apply 4×4 LFNST, the 4×4 input block X, $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$

is first represented as a vector $\vec{X}$:

$$\vec{X} = [X_{00}X_{01}X_{02}X_{03}X_{10}X_{11}X_{12}X_{13}X_{20}X_{21}X_{22}X_{23}X_{30}X_{31}X_{32}X_{33}]^T$$

The non-separable transform is calculated as $\vec{F} = T \cdot \vec{X}$, where $\vec{F}$ indicates the transform coefficient vector, and T is a 16×16 transform matrix. The 16×1 coefficient vector $\vec{F}$ is subsequently re-organized as a 4×4 block using the scanning order for that block (i.e., horizontal, vertical or diagonal). The coefficients with smaller indexes will be placed with the smaller scanning indexes in the 4×4 coefficient block.

Reduced Non-Separable Transform

LFNST (low-frequency non-separable transform) is based on direct matrix multiplication approach to apply non-separable transform so that it is implemented in a single pass without multiple iterations. However, the non-separable transform matrix dimension needs to be reduced to minimize computational complexity and memory space to store the transform coefficients. Hence, a reduced non-separable transform (or RST) method is used in LFNST. The main idea of the reduced non-separable transform is to map an N dimensional vector to an R dimensional vector in a different space, where N/R (R<N) is the reduction factor and N is normally equal to 64 for 8×8 NSST (Non-Separable Secondary Transforms). Hence, instead of NxN matrix, RST matrix becomes an R×N matrix as follows:

$$T_{R \times N} = \begin{bmatrix} t_{11} & t_{12} & t_{13} & \cdots & t_{1N} \\ t_{21} & t_{22} & t_{23} & & t_{2N} \\ \vdots & & \ddots & & \vdots \\ t_{R1} & t_{R2} & t_{R3} & \cdots & t_{RN} \end{bmatrix}$$

where the R rows of the transform are R bases of the N dimensional space. The inverse transform matrix for RT is the transpose of its forward transform. For 8×8 LFNST, a reduction factor of 4 is applied. In this case, a 64×64 direct matrix, which is normally used for an 8×8 non-separable transform matrix, is reduced to 16×48 direct matrix. Hence, the 48×16 inverse RST matrix is used at the decoder side to generate core (primary) transform coefficients in the 8×8 top-left region. When 16×48 matrices are applied instead of 16×64 with the same transform set configuration, each of which takes 48 input data from three 4×4 blocks in a top-left 8×8 block excluding the right-bottom 4×4 block.

With the help of the reduced dimension, memory usage for storing all LFNST matrices is reduced from 10 KB to 8 KB with reasonable performance drop. In order to reduce complexity, LFNST is restricted to be applicable only if all coefficients outside the first coefficient sub-group are non-significant. Hence, all primary-only transform coefficients have to be zeroed out when LFNST is applied. This allows a conditioning of the LFNST index signaling on the last-significant position. Hence, it avoids the extra coefficient scanning in the current LFNST design, which is needed for checking for significant coefficients only at specific positions. The worst-case handling of LFNST, in terms of multiplications per pixel, restricts the non-separable transforms for 4×4 and 8×8 blocks to 8×16 and 8×48 transforms, respectively. In those cases, the last-significant scan position has to be less than 8 when LFNST is applied for other sizes less than 16. For blocks with a shape of 4×N, N×4 where N>=4, the proposed restriction implies that the LFNST is applied only once and applied to the top-left 4×4 region only. For blocks with a shape of 8×N, N×8 where N>=8, the proposed restriction implies that the LFNST is applied only once and applied to the top-left 8×8 region only. Since all primary-only coefficients are zeroed out when LFNST is applied, the number of operations needed for the primary transforms is reduced in such cases. From encoder perspective, the quantization of coefficients is remarkably simplified when LFNST transforms are tested. A rate-distortion optimized quantization has to be done at most for the first 8 or 16 coefficients in the scan order, and the remaining coefficients are forced to be zero.

LFNST Transform Selection

There are a total of 4 transform sets and 2 non-separable transform matrices (kernels) per transform set in LFNST. The mapping from the intra prediction mode to the transform set is pre-defined as shown in the following table. If one of three CCLM (Cross-Component Linear Model) modes (i.e., INTRA_LT_CCLM, INTRA_T_CCLM or INTRA_L_CCLM as indicated by 81<=predModeIntra<=83) is used for the current block, transform set 0 or the intra prediction mode for luma is selected for the current chroma block. For each transform set, the selected non-separable secondary transform candidate (or named as non-separable transform matric) is further specified by the explicitly signaled LFNST index. The LFNST index is signaled in a bit-stream once per Intra CU after transform coefficients.

TABLE 3

Transform selection table

| IntraPredMode | Transform set index |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |

TABLE 3-continued

Transform selection table

| IntraPredMode | Transform set index |
|---|---|
| 56 <= IntraPredMode <= 80 | 1 |
| 81 <= IntraPredMode <= 83 | 0 |

LFNST Index Signaling and Interaction With Other Tools

Since LFNST is restricted to be applicable only if all coefficients outside the first coefficient sub-group are non-significant, LFNST index (CU-level) coding depends on the position of the last significant coefficient. In addition, the LFNST index is context coded. However, the LFNST index does not depend on intra prediction mode and at least one bin is context coded.

Furthermore, LFNST is applied for intra CU in both intra and inter slices for luma and/or chroma. If a dual tree is enabled, LFNST indices for luma and chroma are signaled separately. For inter slice (i.e., the dual tree being disabled), a single LFNST index is signaled and used for luma and/or chroma.

Considering that a large CU greater than 64×64 is implicitly split (TU tiling) due to the existing maximum transform size restriction (i.e., 64×64 or set with configuration), an LFNST index search could increase data buffering by four times for a certain number of decode pipeline stages. Therefore, the maximum size that LFNST is allowed is restricted to 64×64 or maximum transform size. Note that MTS is enabled only with LFNST off.

As proposed in JVET-P0058 (T. Tsukuba, et al., "CE8-2.1: Transform Skip for Chroma with limiting maximum number of context-coded bin in TS residual coding," ITU-T SG 16 WP 3 and ISO/IEC JTC 1/SC 29/WG 11, 16th Meeting: Geneva, CH, 1-11 October 2019, Document: JVET-P0058), it introduces transform skip (TS) for chroma and applies TS residual coding to transform-skipped chroma block. For example, TS is enabled for chroma in all chroma sampling formats. In addition, since BDPCM (block-based delta pulse code modulation) uses TS, BDPCM can be enabled only when TS enabling condition is satisfied. The TS enabling condition contains size constraint which means when the block width is smaller than or equal to the max transform skip size (MaxTsSize) and the block height is smaller than or equal to MaxTsSize. If the condition is satisfied, TS can be enabled. MaxTsSize is a fixed integer or a variable equal to 1 <<(log 2_transform_skip_max_size_minus2+2), where log 2_transform_skip_max_size_minus2 specifies the maximum block size used for transform skip. log 2_transform_skip_max_size_minus2 shall be in the range of 0 to 3 and is inferred to be equal to 0 when not present.

In VVC, the size constraint on TS for luma is that if tbWidth<=MaxTsSize && tbHeight<=MaxTsSize, TS can be enabled.

In VVC, the size constraint on TS for chroma is that if wC<=MaxTsSize && hC<=MaxTsSize, TS can be enabled.

In the restrictions mentioned above, wC=tbWidth/SubWidthC and hC=tbHeight/SubHeightC. tbWidth is the block width for luma and tbHeight is the block height for luma. The variables SubWidthC and SubHeightC are specified in the following table depending on the chroma format sampling structure, which is specified through chroma_format_idc and separate_colour_plane_flag. Other values of chroma_format_idc, SubWidthC and SubHeightC may be specified in the future.

TABLE 4

Variables SubWidthC and SubHeightC specification

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

The detailed signaling condition for transform skip mode for each component is shown in the following table.

TABLE 5

Signaling condition for transform skip mode for each component

Descriptor

```
transform_unit( x0, y0, tbWidth, tbHeight, treeType, subTuIndex, chType ) {
    if( IntraSubPartitionsSplitType != ISP_NO_SPLIT &&
        treeType == SINGLE_TREE && subTuIndex == NumIntraSubPartitions − 1 ) {
        xC = CbPosX[ chType ][ x0 ][ y0 ]
        yC = CbPosY[ chType ][ x0 ][ y0 ]
        wC = CbWidth[ chType ][ x0 ][ y0 ] / SubWidthC
        hC = CbHeight[ chType ][ x0 ][ y0 ] / SubHeightC
    } else {
        xC = x0
        yC = y0
        wC = tbWidth / SubWidthC
        hC = tbHeight / SubHeightC
    }
```

TABLE 5-continued

Signaling condition for transform skip mode for each component

| | Descriptor |
|---|---|
| chromaAvailable = treeType != DUAL_TREE_LUMA && ChromaArrayType != 0 &&<br>   ( IntraSubPartitionsSplitType = = ISP_NO_SPLIT \|  \|<br>   ( IntraSubPartitionsSplitType != ISP_NO_SPLIT &&<br>   subTuIndex = = NumIntraSubPartitions − 1 ) )<br>if( ( treeType = = SINGLE_TREE \| \| treeType = =<br>DUAL_TREE_CHROMA ) &&<br>     ChromaArrayType != 0 ) {<br>  if( ( IntraSubPartitionsSplitType = = ISP_NO_SPLIT &&<br>!( cu_sbt_flag &&<br>   ( ( subTuIndex = = 0 && cu_sbt_pos_flag ) \| \|<br>    ( subTuIndex = = 1 && !cu_sbt_pos_flag ) ) ) ) \| \|<br>  ( IntraSubPartitionsSplitType != ISP_NO_SPLIT &&<br>   ( subTuIndex = = NumIntraSubPartitions − 1 ) ) ) {<br>   tu_cbf_cb[ xC ][ yC ] | ae(v) |
|    tu_cbf_cr[ xC ][ yC ] | ae(v) |
|   }<br>}<br>if( treeType = = SINGLE_TREE \| \| treeType = = DUAL_TREE_LUMA )<br>{<br>  if( ( IntraSubPartitionsSplitType = = ISP_NO_SPLIT &&<br>!( cu_sbt_flag &&<br>   ( ( subTuIndex = = 0 && cu_sbt_pos_flag ) \| \|<br>    ( subTuIndex = = 1 && !cu_sbt_pos_flag ) ) ) &&<br>   ( CuPredMode[ chType ][ x0 ][ y0 ] = = MODE_INTRA \| \|<br>   ( chromaAvailable && ( tu_cbf_cb[ xC ][ yC ] \| \|<br>tu_cbf_cr[ xC ][ yC ] ) ) ) \| \|<br>    CbWidth[ chType ][ x0 ][ y0 ] > MaxTbSizeY \| \|<br>    CbHeight[ chType ][ x0 ][ y0 ] > MaxTbSizeY ) ) \| \|<br>  ( IntraSubPartitionsSplitType != ISP_NO_SPLIT &&<br>   ( subTuIndex < NumIntraSubPartitions − 1 \| \| !InferTuCbfLuma ) ) )<br>   tu_cbf_luma[ x0 ][ y0 ] | ae(v) |
|   if(IntraSubPartitionsSplitType != ISP_NO_SPLIT )<br>   InferTuCbfLuma = InferTuCbfLuma && !tu_cbf_luma[ x0 ][ y0 ]<br>}<br>if( ( CbWidth[ chType ][ x0 ][ y0 ] > 64 \| \|<br>CbHeight[ chType ][ x0 ][ y0 ] > 64 \| \|<br>  tu_cbf_luma[ x0 ][ y0 ] \| \| ( chromaAvailable && (<br>tu_cbf_cb[ xC ][ yC ] \| \|<br>  tu_cbf_cr[ xC ][ yC ] ) ) && treeType != DUAL_TREE_CHROMA )<br>{<br>  if( cu_qp_delta_enabled_flag && !IsCuQpDeltaCoded ) {<br>   cu_qp_delta_abs | ae(v) |
|    if( cu_qp_delta_abs )<br>    cu_qp_delta_sign_flag | ae(v) |
|   }<br>}<br>if( ( CbWidth[ chType ][ x0 ][ y0 ] > 64 \| \|<br>CbHeight[ chType ][ x0 ][ y0 ] > 64 \| \|<br>  ( chromaAvailable && ( tu_cbf_cb[ xC ][ yC ] \| \|<br>tu_cbf_cr[ xC ][ yC ] ) ) ) &&<br>   treeType != DUAL_TREE_LUMA ) {<br>  if( cu_chroma_qp_offset_enabled_flag &&<br>!IsCuChromaQpOffsetCoded) {<br>   cu_chroma_qp_offset_flag | ae(v) |
|    if( cu_chroma_qp_offset_flag &&<br>chroma_qp_offset_list_len_minus1 > 0 )<br>    cu_chroma_qp_offset_idx | ae(v) |
|   }<br>}<br>if( sps_joint_cbcr_enabled_flag && ( ( CuPredMode[ chType ][ x0 ][ y0 ]<br>= = MODE_INTRA && ( tu_cbf_cb[ xC ][ yC ] \| \| tu_cbf_cr[ xC ][ yC ]<br>) ) \| \|<br>  ( tu_cbf_cb[ xC ][ yC ] && tu_cbf_cr[ xC ][ yC ] ) ) &&<br>chromaAvailable )<br>  tu_joint_cbcr_residual_flag[ xC ][ yC ] | ae(v) |
| if( tu_cbf_luma[ x0 ][ y0 ] && treeType != DUAL_TREE_CHROMA )<br>{<br>  if( sps_transform_skip_enabled_flag && !BdpcmFlag[ x0 ][ y0 ][ 0 ]<br>&&<br>   tbWidth <= MaxTsSize && tbHeight <= MaxTsSize &&<br>   ( IntraSubPartitionsSplit[ x0 ][ y0 ] = = ISP_NO_SPLIT ) &&<br>!cu_sbt_flag )<br>   transform_skip_flag[ x0 ][ y0 ][ 0 ] | ae(v) |
|   if( !transform_skip_flag[ x0 ][ y0 ][ 0 ] )<br>   residual_coding( x0, y0, Log2( tbWidth ), Log2( tbHeight ), 0 ) | |

TABLE 5-continued

Signaling condition for transform skip mode for each component

| | Descriptor |
|---|---|
| ```
        else
            residual_ts_coding( x0, y0, Log2( tbWidth ), Log2( tbHeight ), 0 )
    }
    if( tu_cbf_cb[ xC ][ yC ] && treeType != DUAL_TREE_LUMA ) {
        if( sps_transform_skip_enabled_flag && !BdpcmFlag[ x0 ][ y0 ][ 1 ]
&&
            wC <= MaxTsSize && hC <= MaxTsSize && !cu_sbt_flag )
            transform_skip_flag[ xC ][ yC ][ 1 ]
        if( !transform_skip_flag[ xC ][ yC ][ 1 ] )
            residual_coding( xC, yC, Log2( wC ), Log2( hC ), 1 )
        else
            residual_ts_coding( xC, yC, Log2( wC ), Log2( hC ), 1 )
    }
    if( tu_cbf_cr[ xC ][ yC ] && treeType != DUAL_TREE_LUMA &&
        !( tu_cbf_cb[ xC ][ yC ] && tu_joint_cbcr_residual_flag[ xC ][ yC ] ) )
    {
        if( sps_transform_skip_enabled_flag && !BdpcmFlag[ x0 ][ y0 ][ 2 ]
&&
            wC <= MaxTsSize && hC <= MaxTsSize && !cu_sbt_flag )
            transform_skip_flag[ xC ][ yC ][ 2 ]
        if( !transform_skip_flag[ xC ][ yC ][ 2 ] )
            residual_coding( xC, yC, Log2( wC ), Log2( hC ), 2 )
        else
            residual_ts_coding( xC, yC, Log2( wC ), Log2( hC ), 2 )
    }
}
``` | ae(v)<br><br><br><br><br><br><br><br><br><br>ae(v) |

In the above syntax table, transform_skip_flag[x0][y0][cIdx] specifies whether a transform is applied to the associated transform block or not. The array indices x0, y0 specify the location (x0, y0) of the top-left luma sample of the considered transform block relative to the top-left luma sample of the picture. The array index cIdx specifies an indicator for the color component; it is equal to 0 for Y, 1 for Cb, and 2 for Cr. transform_skip_flag[x0][y0][cIdx] equal to 1 specifies that no transform is applied to the associated transform block. transform_skip_flag[x0][y0][cIdx] equal to 0 specifies that the decision whether transform is applied to the associated transform block or not depends on other syntax elements.

When transform_skip_flag[x0][y0][cIdx] is not present, it is inferred as follows:
If BdpcmFlag[x0][y0][cIdx] is equal to 1, transform_skip_flag[x0][y0][cIdx] is inferred to be equal to 1.
Otherwise (BdpcmFlag[x0][y0][cIdx] is equal to 0), transform_skip_flag[x0][y0][cIdx] is inferred to be equal to 0.

In the above, BdpcmFlag[x0][y0][cIdx] is a variable corresponding to an intra BDPCM flag for the luma component (i.e., cIdx=0) or for the chroma component (i.e., cIdx=1 or 2).

BDPCM (Block DPCM)

Old BDPCM method proposed in JVET-M0057 ("CE8: BDPCM with horizontal/vertical predictor and independently decodable areas (test 8.3.1b)", JVET-M0057, Joint Video Exploration Team (JVET) of ITU-T SG 16 WP 3 and ISO/IEC JTC 1/SC 29/WG 11, Marrakech, MA, January 2019) uses reconstructed samples to predict the rows or columns line by line. The signaled BDPCM direction indicates whether vertical or horizontal prediction is used. The reference pixels used are unfiltered samples. The prediction error is quantized in the spatial domain. Pixels are reconstructed by adding the de-quantized prediction error to the prediction.

In JVET-N0413 (T. Tsukuba, et al., "CE8-2.1: Transform Skip for Chroma with limiting maximum number of context-coded bin in TS residual coding," Joint Video Experts Team (JVET) of ITU-T SG 16 WP 3 and ISO/IEC JTC 1/SC 29/WG 11, 16th Meeting: Geneva, CH, 1-11 Oct. 2019, Document: JVET-P0058), as an alternative scheme to old BDPCM, quantized residual domain BDPCM, called RDPCM or BDPCM, is proposed. The signaling and prediction directions used are identical to old BDPCM scheme as described in JVET-M0057 (F. Henry, et al., "CE8: BDPCM with horizontal/vertical predictor and independently decodable areas (test 8.3.1b)", Joint Video Exploration Team (JVET) of ITU-T SG 16 WP 3 and ISO/IEC JTC 1/SC 29/WG 11, Marrakech, MA, January 2019, Document: JVET-M0057). The intra prediction for BDPCM is done on the entire block by sample copying in prediction direction (horizontal or vertical prediction) similar to general intra prediction. The residual is quantized and the delta between the quantized residual and its predictor (horizontal or vertical) quantized value is coded. This can be described as follows.

For an M (rows)×N (cols) block, let $r_{i,j}$, $0 \leq i \leq M-1$, $0 \leq j \leq N-1$, be the prediction residual after performing intra prediction horizontally (i.e., copying left neighbor pixel value across the predicted block line by line) or vertically (i.e., copying top neighbor line to each line in the predicted block) using unfiltered samples from above or left block boundary samples. Let $Q(r_{i,j})$, $0 \leq i \leq M-1$, $0 \leq j \leq N-1$, denote the quantized version of the residual $r_{i,j}$, where the residual is difference between original block and the predicted block values. The block DPCM is then applied to the quantized residual samples, resulting in a modified M×N array with elements $\tilde{r}_{i,j}$. When vertical BDPCM is signaled, the residual quantized samples are obtained by:

$$\tilde{r}_{i,j} = \begin{cases} Q(r_{i,j}), & i = 0, 0 \leq j \leq (N-1) \\ Q(r_{i,j}) - Q(r_{(i-1),j}), & 1 \leq i \leq (M-1), 0 \leq j \leq (N-1) \end{cases}.$$

For horizontal prediction, similar rules apply, and the residual quantized samples are obtained by:

$$\tilde{r}_{i,j} = \begin{cases} Q(r_{i,j}), & 0 \le i \le (M-1), j = 0 \\ Q(r_{i,j}) - Q(r_{i,(j-1)}), & 0 \le i \le (M-1), 1 \le j \le (N-1) \end{cases}.$$

The residual quantized samples $\tilde{r}_{i,j}$ are coded and sent to the decoder.

On the decoder side, the above calculations are reversed to produce $Q(r_{i,j})$, $0 \le i \le M-1$, $0 \le j \le N-1$. For vertical prediction case, $Q(r_{i,j}) = \Sigma_{k=0}^{i} \tilde{r}_{k,j}$, $0 \le i \le (M-1)$, $0 \le j \le (N-1)$.

For horizontal case, $Q(r_{i,j}) = \Sigma_{k=0}^{j} \tilde{r}_{i,k}$, $0 \le i \le (M-1)$, $0 \le j \le (N-1)$.

The inverse-quantized quantized-residuals, $Q^{-1}(Q(r_{i,j}))$, are added to the intra block prediction values to produce the reconstructed sample values.

The syntax of RDPCM is signaled at CU/CB level, when the CU/CB is a luma intra CU/CB and the CB width and/or height is smaller than or equal to a predefined threshold (e.g., 16, 32, 64, 128, 256, 512, or 1024), one flag (e.g., bdpcm_flag) is signaled to indicate whether to enable RDPCM or not. If bdpcm_flag is true, one additional flag (bdpcm_dir_flag) is signaled to the prediction direction used in the RDPCM. For example, if bdpcm_dir_flag is equal to 0, the horizontal direction is used; otherwise if bdpcm_dir_flag is equal to 1, the vertical direction is used.

BDPCM can be applied to luma and chroma. The syntax table for BDPCM is shown in the following Table. More details can be found in JVET-N0413 (M. Karczewicz, et al., "CE8-related: Quantized residual BDPCM," Joint Video Experts Team (JVET) of ITU-T SG 16 WP 3 and ISO/IEC JTC 1/SC 29/WG 11, 14th Meeting: Geneva, CH, 19-27 Mar. 2019, Documents: JVET-N0413).

TABLE 6

Syntax table for BDPCM

| | |
|---|---|
| if( sps_bdpcm_enabled_flag && cbWidth <= MaxTsSize && cbHeight <= MaxTsSize ) | |
|   intra_bdpcm_luma_flag | ae(v) |
| if( intra_bdpcm_luma_flag ) | |
|   intra_bdpcm_luma_dir_flag | ae(v) |
| ... | ... |
| if( cbWidth <= MaxTsSize && cbHeight <= MaxTsSize && sps_bdpcm_chroma_enabled_flag ) { | |
|   intra_bdpcm_chroma_flag | ae(v) |
|   if( intra_bdpcm_chroma_flag ) | |
|     intra_bdpcm_chroma_dir_flag | ae(v) |
| } else { | |

VVC supports the joint coding of chroma residual (JCCR) tool where the chroma residuals are coded jointly. The usage (activation) of the JCCR mode is indicated by a TU-level flag, tu_joint_cbcr_residual_flag and the selected mode is implicitly indicated by the chroma CBFs. The flag, tu_joint_cbcr_residual_flag is present if either or both chroma CBFs for a TU are equal to 1. In the PPS and slice header, chroma QP offset values are signaled for the JCCR mode to differentiate from the usual chroma QP offset values signaled for the regular chroma residual coding mode. These chroma QP offset values are used to derive the chroma QP values for some blocks coded using the JCCR mode. The JCCR mode has 3 sub-modes. When a corresponding JCCR sub-mode (sub-modes 2 in Table 7) is active in a TU, this chroma QP offset is added to the applied luma-derived chroma QP during quantization and decoding of that TU. Table 7 corresponds to Table 3-13 of JVET-Q2002 (J. Chen, et al., "Algorithm description for Versatile Video Coding and Test Model 8 (VTM 8)", Joint Video Experts Team (JVET) of ITU-T SG 16 WP 3 and ISO/IEC JTC 1/SC 29/WG 11, 17th Meeting: Brussels, BE, 7-17 Jan. 2020, Document: JVET-Q2002). For the other JCCR sub-modes (sub-modes 1 and 3 in Table 7), the chroma QPs are derived in the same way as for conventional Cb or Cr blocks. The reconstruction process of the chroma residuals (resCb and resCr) from the transmitted transform blocks is depicted in Table 7. When the JCCR mode is activated, one single joint chroma residual block (resJointC[x][y] in Table 7) is signaled, and residual block for Cb (resCb) and residual block for Cr (resCr) are derived considering information such as tu_cbf_cb, tu_cbf_cr, and CSign, which is a sign value specified in the slice header.

At the encoder side, the joint chroma components are derived as explained in the following. Depending on the mode (listed in the tables above), resJointC{1,2} are generated by the encoder as follows:

If mode is equal to 2 (single residual with reconstruction Cb=C, Cr=CSign*C), the joint residual is determined according to resJointC[x][y]=(resCb[x][y]+CSign*resCr[x][y])/2, Otherwise, if mode is equal to 1 (single residual with reconstruction Cb=C, Cr=(CSign*C)/2), the joint residual is determined according to resJointC[x][y]=(4*resCb[x][y]+2*CSign*resCr[x][y])/5, Otherwise (mode is equal to 3, i. e., single residual, reconstruction Cr=C, Cb=(CSign*C)/2), the joint residual is determined according to resJointC[x][y]=(4*resCr[x][y]+2*CSign*resCb[x][y])/5.

Reconstruction of chroma residuals. The value CSign is a sign value (+1 or −1), which is specified in the slice header, resJointC[ ][ ] is the transmitted residual.

TABLE 7

Syntax table for BDPCM

| tu_cbf_cb | tu_cbf_cr | reconstruction of Cb and Cr residuals | mode |
|---|---|---|---|
| 1 | 0 | resCb[ x ][ y ] = resJointC[ x ][ y ]<br>resCr[ x ][ y ] = ( CSign * resJointC[ x ][ y ] ) >> 1 | 1 |
| 1 | 1 | resCb[ x ][ y ] = resJointC[ x ][ y ]<br>resCr[ x ][ y ] = CSign * resJointC[ x ][ y ] | 2 |
| 0 | 1 | resCb[ x ][ y ] = ( CSign * resJointC[ x ][ y ]) >> 1<br>resCr[ x ][ y ] = resJointC[ x ][ y ] | 3 |

The three joint chroma coding sub-modes described above in Table 7 are only supported in I slices. In P and B slices, only mode 2 is supported. Hence, in P and B slices, the syntax element tu_joint_cbcr_residual_flag is only present if both chroma cbfs are 1.

The JCCR mode can be combined with the chroma transform skip (TS) mode. To speed up the encoder decision, the JCCR transform selection depends on whether the independent coding of Cb and Cr components selects the DCT-2 or the TS as the best transform, and whether there are non-zero coefficients in independent chroma coding. Specifically, if one chroma component selects DCT-2 (or TS) and the other component is all zero, or both chroma components select DCT-2 (or TS), then only DCT-2 (or TS) will be considered in JCCR encoding. Otherwise, if one component selects DCT-2 and the other selects TS, then both DCT-2 and TS will be considered in JCCR encoding. More details can be founded in JVET-N0054 (J. Lainema, "CE7: Joint coding of chrominance residuals (CE7-1)," Joint Video Experts Team (JVET) of ITU-T SG 16 WP 3 and ISO/IEC JTC 1/SC 29/WG 11, 14th Meeting: Geneva, CH, 19-27 Mar. 2019, Documents: JVET-N0413).

Intra Sub-Partitions (ISP) in VVC

The intra sub-partitions (ISP) divides luma intra-predicted blocks vertically or horizontally into 2 or 4 sub-partitions depending on the block size. For example, the minimum block size for ISP to split a block is 4×8 (or 8×4). If the block size is greater than 4×8 (or 8×4) then the corresponding block is divided into 4 sub-partitions. It has been noted that the M×128 (with M≤64) and M×128 (with N≤64) ISP blocks could cause a potential issue with the 64×64 VDPU. For example, an M×128 CU in the single tree case has an M×128 luma TB and two corresponding (M/2)×64 chroma TBs. If the CU uses ISP, then the luma TB will be divided into four M×32 TBs (only the horizontal split is possible), each of them smaller than a 64×64 block. However, in the current design of ISP chroma blocks are not divided. Therefore, both chroma components will have a size greater than a 32×32 block. Analogously, a similar situation could be created with a 126×N CU using ISP. Hence, these two cases are an issue for the 64×64 decoder pipeline. For this reason, the CU sizes that can use ISP is restricted to a maximum of 64×64. 2A and FIG. 2B show examples of the two possibilities. All sub-partitions fulfill the condition of having at least 16 samples. FIG. 2A illustrates the case for the block size of 4×8 or 8×4. In this case, the block 210 is partitioned horizontally into two sub-blocks 220 or vertically into two sub-blocks 230. FIG. 2B illustrates the case for the block size other than 4×8 and 8×4. In this case, the block 240 is partitioned horizontally into four sub-blocks 250 or vertically into four sub-blocks 260.

In ISP, the dependence of 1×N or 2×N subblock prediction on the reconstructed values of previously decoded 1×N or 2×N subblocks of the coding block is not allowed so that the minimum width of prediction for subblocks becomes four samples. For example, an 8×N (N>4) coding block that is coded using ISP with vertical split is split into two prediction regions each of size 4×N and four transforms of size 2×N. Also, a 4×N coding block that is coded using ISP with vertical split is predicted using the full 4×N block; four transform each of 1×N is used. Although the transform sizes of 1×N and 2×N are allowed, it is asserted that the transform of these blocks in 4×N regions can be performed in parallel. For example, when a 4×N prediction region contains four 1×N transforms, there is no transform in the horizontal direction; the transform in the vertical direction can be performed as a single 4×N transform in the vertical direction. Similarly, when a 4×N prediction region contains two 2×N transform blocks, the transform operation of the two 2×N blocks in each direction (horizontal and vertical) can be conducted in parallel. Thus, there is no delay added in processing these smaller blocks than processing 4×4 regular-coded intra blocks.

For each sub-partition, reconstructed samples are obtained by adding the residual signal to the prediction signal. Here, a residual signal is generated by the processes such as entropy decoding, inverse quantization and inverse transform. Therefore, the reconstructed sample values of each sub-partition are available to generate the prediction of the next sub-partition, and each sub-partition is processed repeatedly. In addition, the first sub-partition to be processed is the one containing the top-left sample of the CU and then continuing downwards (horizontal split) or rightwards (vertical split). As a result, reference samples used to generate the sub-partitions prediction signals are only located at the left and above sides of the lines. All sub-partitions share the same intra mode. The followings are summary of interaction of ISP with other coding tools.

Multiple Reference Line (MRL): if a block has an MRL index other than 0, then the ISP coding mode will be inferred to be 0 and therefore ISP mode information will not be sent to the decoder.

Entropy coding coefficient group size: the sizes of the entropy coding subblocks have been modified so that they have 16 samples in all possible cases, as shown in Table 8. Note that the new sizes only affect blocks produced by ISP in which one of the dimensions is less than 4 samples. In all other cases coefficient groups keep the 4×4 dimensions.

CBF coding: it is assumed to have at least one of the sub-partitions has a non-zero CBF. Hence, if n is the number of sub-partitions and the first n−1 sub-partitions have produced a zero CBF, then the CBF of the n-th sub-partition is inferred to be 1.

MPM usage: the MPM flag will be inferred to be one in a block coded by ISP mode, and the MPM list is modified to exclude the DC mode and to prioritize horizontal intra modes for the ISP horizontal split and vertical intra modes for the vertical one.

Transform size restriction: all ISP transforms with a length larger than 16 points uses the DCT-II.

PDPC: when a CU uses the ISP coding mode, the PDPC filters will not be applied to the resulting sub-partitions.

MTS flag: if a CU uses the ISP coding mode, the MTS CU flag will be set to 0 and it will not be sent to the decoder. Therefore, the encoder will not perform RD tests for the different available transforms for each resulting sub-partition. The transform choice for the ISP mode will instead be fixed and selected according the intra mode, the processing order and the block size utilized. Hence, no signaling is required. For example, let $t_H$ and $t_V$ be the horizontal and the vertical transforms selected respectively for the w×h sub-partition, where w is the width and h is the height. Then the transform is selected according to the following rules:

If w=1 or h=1, then there is no horizontal or vertical transform respectively.

If w=2 or w>32, $t_H$=DCT-II

If h=2 or h>32, $t_V$=DCT-II

Otherwise, the transform is selected as in Table 8.

Entropy coding coefficient group size

TABLE 9

Transform selection depends on intra mode

| Block Size | Coefficient group Size |
| --- | --- |
| 1 × N, N ≥ 16 | 1 × 16 |
| N × 1, N ≥ 16 | 16 × 1 |
| 2 × N, N ≥ 8 | 2 × 8 |
| N × 2, N ≥ 8 | 8 × 2 |
| All other possible M × N cases | 4 × 4 |

TABLE 8

Entropy coding coefficient group size

| Block Size | Coefficient group Size |
| --- | --- |
| 1 × N, N ≥ 16 | 1 × 16 |
| N × 1, N ≥ 16 | 16 × 1 |
| 2 × N, N ≥ 8 | 2 × 8 |
| N × 2, N ≥ 8 | 8 × 2 |
| All other possible M × N cases | 4 × 4 |

TABLE 9

Transform selection depends on intra mode

| Intra mode | $t_H$ | $t_V$ |
| --- | --- | --- |
| Planar | DST-VII | DST-VII |
| Ang. 31, 32, 34, 36, 37 | | |
| DC | DCT-II | DCT-II |
| Ang. 33, 35 | | |
| Ang. 2, 4, 6 . . . 28, 30 | DST-VII | DCT-II |
| Ang. 39, 41, 43 . . . 63, 65 | | |
| Ang. 3, 5, 7 . . . 27, 29 | DCT-II | DST-VII |
| Ang. 38, 40, 42 . . . 64, 66 | | |

In ISP mode, all 67 intra modes are allowed. PDPC is also applied if corresponding width and height is at least 4 samples long. In addition, the condition for intra interpolation filter selection doesn't exist anymore, and Cubic (DCT-IF) filter is always applied for fractional position interpolation in ISP mode. More details can be founded in JVET-M0102 (S. De-Luxán-Hernández, et al., "CE3: Intra Sub-Partitions Coding Mode (Tests 1.1.1 and 1.1.2)", Joint Video Experts Team (JVET) of ITU-T SG 16 WP 3 and ISO/IEC JTC 1/SC 29/WG 11, 13th Meeting: Marrakech, MA, 9-18 Jan. 2019, Document: JVET-M0102).

"Block" in this proposal can be TB/TU/PU/PB/CB/CU.

BRIEF SUMMARY OF THE INVENTION

Method and apparatus for video encoding and decoding using Low-Frequency Non-Separable Transform (LFNST) mode is disclosed. According to the present invention, in the decoding process, input data related to a current coding unit (CU) in a current picture are received, where the current CU is partitioned into one or more transform blocks (TBs) and the input data corresponds to coded data of the current CU. One or more Coded Block Flag (CBF) indications for one or more target TBs are checked based on the coded data. An LFNST syntax is parsed if one or more conditions are satisfied. The LFNST syntax indicates whether the LFNST mode is applied to the current CU and/or which LFNST kernel is applied if the LFNST mode is applied. The conditions comprise said one or more CBF indications for said one or more target TBs being false. The current CU is decoded at the decoder side according to the LFNST mode as indicated by the LFNST syntax.

In the encoding process, input data related to a current coding unit (CU) in a current picture are received where the input data corresponds to primary transformed data. The LFNST process is applied based on a LFNST kernel to derive temporary output data. An LFNST syntax is determined and signaled if one or more conditions are satisfied. The conditions comprise one or more Coded Block Flag (CBF) indications for one or more target transform blocks (TBs) being false. The current CU is encoded according to the LFNST mode as indicated by the LFNST syntax determined.

In one embodiment, the target TBs correspond to one or more TBs with Transform Skip (TS) flags not equal to 0.

In one embodiment, in a luma splitting tree, the current CU corresponds to a luma coding block, and said one or more target TBs correspond to one or more luma TBs. In another embodiment, in a chroma splitting tree, the current CU corresponds to one or more chroma coding blocks, and said one or more target TBs correspond to one or more chroma TBs. In yet another embodiment, in a single splitting tree, the current CU corresponds to one luma coding block and one or more chroma coding blocks, and said one or more target TBs correspond to one or more luma TBs and one or more chroma TBs.

In one embodiment, the target TBs correspond to a predefined TB for each coding block in the current CU. For example, the predefined TB corresponds to the first TB for each coding block in the current CU.

In one embodiment, if all of the CBF indications for the target TBs are false, the LFNST mode is allowed for the current CU. In another embodiment, if all of the CBF indications for the target TBs with Transform Skip (TS) flags not equal to 0 are false, the LFNST mode is allowed for the current CU. In yet another embodiment, if any one of the CBF indications for the target TBs with Transform Skip (TS) flags not equal to 0 is true, the LFNST mode is disallowed for the current CU.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF THE INVENTION

Figure 1:
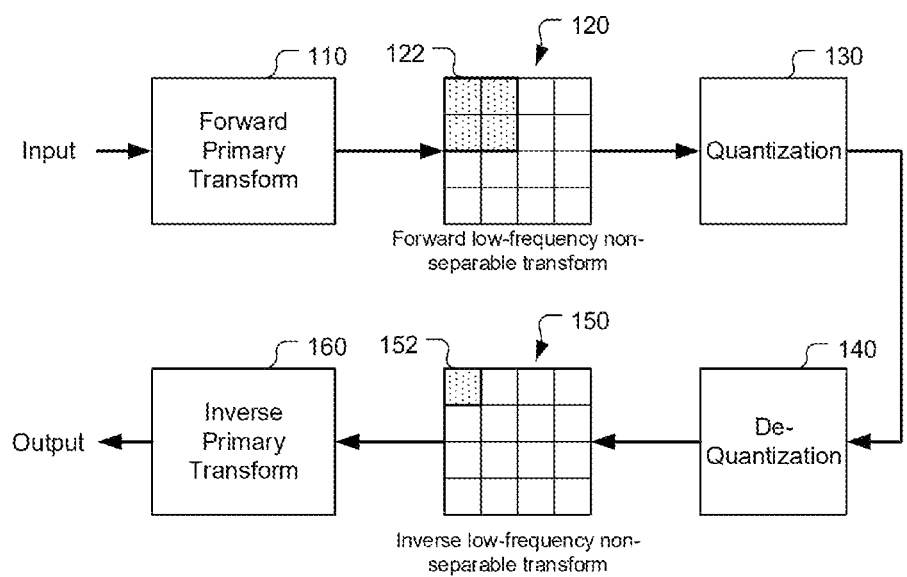
FIG. 1 illustrates an example of LFNST (low-frequency non-separable transform) process.
Figure 2A:
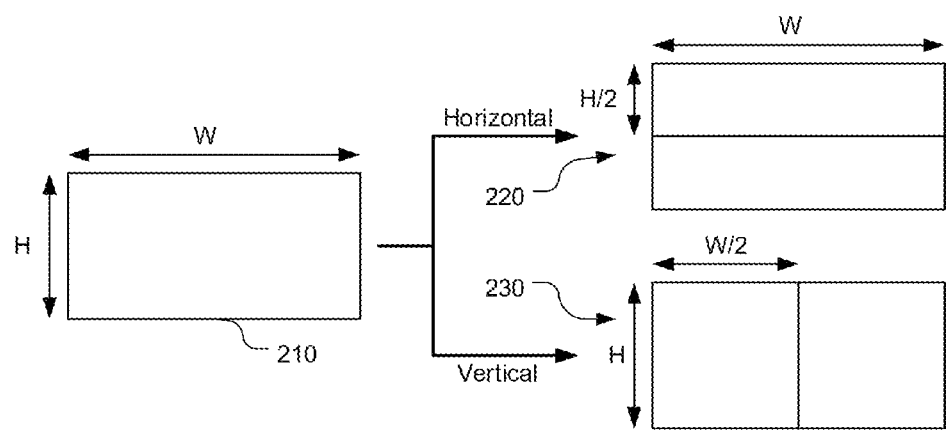
FIG. 2A and FIG. 2B show examples of intra sub-partitions (ISP).
Figure 2B:
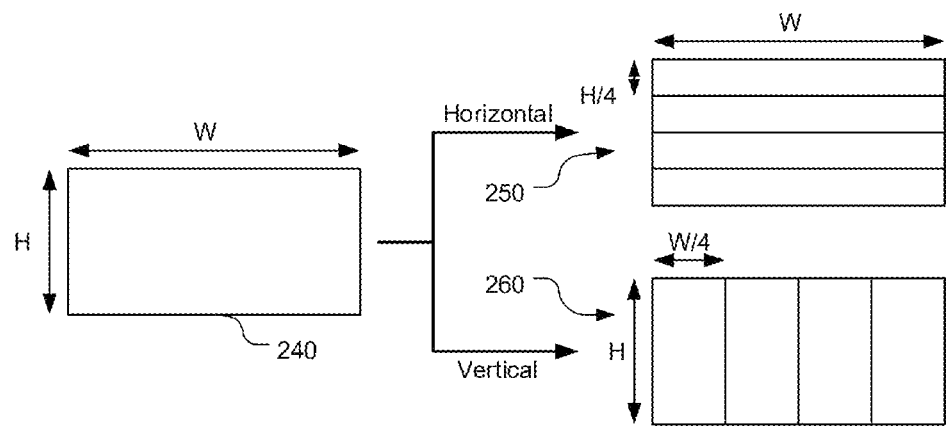

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

The combinations of LFNST with transform skip should not be allowed since when transform skip is applied, no transform process (primary/core transform and/or secondary transform) shall be used. In VVC Draft 7 (B. Bross, et al., "Versatile Video Coding (Draft 7)", Joint Video Experts Team (JVET) of ITU-T SG 16 WP 3 and ISO/IEC JTC 1/SC 29/WG 11, 16th Meeting: Geneva, CH, 1-11 October 2019, Document: JVET-P2001), the syntax for transform skip mode is signaled/parsed at TB level. On the other hand, the syntax for LFNST is signaled/parsed at CU level after all TUs/TBs within that CUs/CBs are signaled/parsed. Therefore, in the current VVC draft text (as shown in Table 10A), the signaling/parsing conditions for LFNST take into consideration of the transform skip flag for luma as follows. As shown in the following syntax table, the existing conditions include the check for luma transform skip (i.e., transform_skip_flag[x0][y0][0]==0) to prevent such combination. For this check, the VVC test model version 7 (VTM7, J. Chen, et al., "Algorithm description for Versatile Video Coding and Test Model 7 (VTM 7)", Joint Video Experts Team (JVET) of ITU-T SG 16 WP 3 and ISO/IEC JTC 1/SC 29/WG 11, 16th Meeting: Geneva, CH, 1-11 October 2019, Document: JVET-P2002) codes appear to match the VVC Draft 7. Syntax table for residual coding according to JVET-P2001 is shown in Table 10B.

TABLE 10A

| Conditions signaling/parsing for LFNST in VVC Draft 7 | |
|---|---|
| | Descriptor |
| coding_unit( x0, y0, cbWidth, cbHeight, cqtDepth, treeType, modeType ) { <br>   chType = treeType = = DUAL_TREE_CHROMA ? 1 : 0 <br>   ... <br>   if( CuPredMode[ chType ][ x0 ][ y0 ] = = MODE_INTRA \|\| <br>     CuPredMode[ chType ][ x0 ][ y0 ] = = MODE_PLT ) { <br>     if( treeType = = SINGLE_TREE \|\| treeType = = DUAL_TREE_LUMA ) { <br>       if( pred_mode_plt_flag ) { <br>         palette_coding( x0, y0, cbWidth, cbHeight, treeType ) <br>       } else { <br>         if( sps_bdpcm_enabled_flag && <br>           cbWidth <= MaxTsSize && cbHeight <= MaxTsSize ) <br>           intra_bdpcm_luma_flag | <br><br><br><br><br><br><br><br><br><br> ae(v) |
|         if( intra_bdpcm_luma_flag ) <br>           intra_bdpcm_luma_dir_flag <br>         else { <br>           ... <br>         } <br>       } <br>     } <br>     if( ( treeType = = SINGLE_TREE \|\| treeType = = DUAL_TREE_CHROMA ) && <br>       ChromaArrayType != 0 ){ <br>       if( pred_mode_plt_flag && treeType = = DUAL_TREE_CHROMA ) <br>         palette_coding( x0, y0, cbWidth / SubWidthC, cbHeight / SubHeightC, <br> treeType ) | <br> ae(v) |

TABLE 10A-continued

Conditions signaling/parsing for LFNST in VVC Draft 7

| | Descriptor |
|---|---|
|       else { <br>         if( !cu_act_enabled_flag ) { <br>           if( cbWidth <= MaxTsSize && cbHeight <= MaxTsSize && <br>             sps_bdpcm_chroma_enabled_flag ) { <br>             intra_bdpcm_chroma_flag | ae(v) |
|             if( intra_bdpcm_chroma_flag ) <br>               intra_bdpcm_chroma_dir_flag | ae(v) |
|           } else { <br>            if( CclmEnabled ) <br>             cclm_mode_flag | ae(v) |
|            if( cclm_mode_flag ) <br>             cclm_mode_idx | ae(v) |
|            else <br>             intra_chroma_pred_mode | ae(v) |
|           } <br>         } <br>       } <br>     } <br>   } else if( treeType != DUAL_TREE_CHROMA ) { /* MODE_INTER or MODE_IBC */ <br>     ... <br>   } <br>   if( CuPredMode[ chType ][ x0 ][ y0 ] != MODE_INTRA && !pred_mode_plt_flag && <br>     general_merge_flag[ x0 ][ y0 ] == 0 ) <br>     cu_cbf | ae(v) |
|   if( cu_cbf) { <br>     ... <br>     LfnstDcOnly = 1 <br>     LfnstZeroOutSigCoeffFlag = 1 <br>     MtsZeroOutSigCoeffFlag = 1 <br>     transform_tree( x0, y0, cbWidth, cbHeight, treeType, chType ) <br>     lfnstWidth = ( treeType == DUAL_TREE_CHROMA ) ? cbWidth / SubWidthC <br>             : ( ( IntraSubPartitionsSplitType == ISP_VER_SPLIT ) ? cbWidth / <br>               NumIntraSubPartitions : cbWidth ) <br>     lfnstHeight = ( treeType == DUAL_TREE_CHROMA ) ? cbHeight / SubHeightC <br>             : ( ( IntraSubPartitionsSplitType == ISP_HOR_SPLIT) ? cbHeight / <br>               NumIntraSubPartitions : cbHeight ) <br>     if( Min( lfnstWidth, lfnstHeight ) >= 4 && sps_lfnst_enabled_flag == 1 && <br>         CuPredMode[ chType ][ x0 ][ y0 ] == MODE_INTRA && <br>         transform_skip_flag[ x0 ][ y0 ][ 0 ] == 0 && <br>         ( treeType != DUAL_TREE_CHROMA || !intra_mip_flag[ x0 ][ y0 ] || <br>           Min( lfnstWidth, lfnstHeight ) >= 16 ) && <br>         Max( cbWidth, cbHeight ) <= MaxTbSizeY) { <br>       if( ( IntraSubPartitionsSplitType != ISP_NO_SPLIT || LfnstDcOnly == 0 ) && <br>         LfnstZeroOutSigCoeffFlag == 1 ) <br>         lfnst_idx | ae(v) |
|     } <br>     if( treeType != DUAL_TREE_CHROMA && lfnst_idx == 0 && <br>       transform_skip_flag[ x0 ][ y0 ][ 0 ] == 0 && Max( cbWidth, cbHeight ) <= 32 && <br>       IntraSubPartitionsSplit[ x0 ][ y0 ] == ISP_NO_SPLIT && cu_sbt_flag == 0 && <br>       MtsZeroOutSigCoeffFlag == 1 && tu_cbf_luma[ x0 ][ y0 ] ) { <br>       if( ( ( CuPredMode[ chType ][ x0 ][ y0 ] == MODE_INTER && <br>         sps_explicit_mts_inter_enabled_flag ) || <br>         ( CuPredMode[ chType ][ x0 ][ y0 ] == MODE_INTRA && <br>         sps_explicit_mts_intra_enabled_flag ) ) ) <br>         mts_idx | ae(v) |
|     } <br>   } | |

TABLE 10B

Syntax table for residual coding in VVC Draft 7

| | Descriptor |
|---|---|
| residual_coding( x0, y0, log2TbWidth, log2TbHeight, cIdx ) { | |
|   if( sps_mts_enabled_flag && cu_sbt_flag && cIdx = = 0 && | |
|       log2TbWidth = = 5 && log2TbHeight < 6 ) | |
|   log2ZoTbWidth = 4 | |
|   else | |
|   log2ZoTbWidth = Min( log2TbWidth, 5 ) | |
|   if( sps_mts_enabled_flag && cu_sbt_flag && cIdx = = 0 && | |
|       log2TbWidth < 6 && log2TbHeight = = 5 ) | |
|     log2ZoTbHeight = 4 | |
|   else | |
|     log2ZoTbHeight = Min( log2TbHeight, 5 ) | |
|   if( log2TbWidth > 0 ) | |
|     last_sig_coeff_x_prefix | ae(v) |
|   if( log2TbHeight > 0 ) | |
|     last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   log2TbWidth = log2ZoTbWidth | |
|   log2TbHeight = log2ZoTbHeight | |
|   remBinsPass1 = ( ( 1 << ( log2TbWidth + log2TbHeight ) ) * 7 ) >> 2 | |
|   log2SbW = ( Min( log2TbWidth, log2TbHeight ) < 2 ? 1 : 2 ) | |
|   log2SbH = log2SbW | |
|   if( log2TbWidth + log2TbHeight > 3 ) { | |
|     if( log2TbWidth < 2 ) { | |
|       log2SbW = log2TbWidth | |
|       log2SbH = 4 − log2SbW | |
|     } else if( log2TbHeight < 2 ) { | |
|       log2SbH = log2TbHeight | |
|       log2SbW = 4 − log2SbH | |
|     } | |
|   } | |
|   numSbCoeff = 1 << ( log2SbW + log2SbH ) | |
|   lastScanPos = numSbCoeff | |
|   lastSubBlock = ( 1 << ( log2TbWidth + log2TbHeight − ( log2SbW + log2SbH ) ) ) − 1 | |
|   do { | |
|     if( lastScanPos = = 0 ) { | |
|       lastScanPos = numSbCoeff | |
|       lastSubBlock− − | |
|     } | |
|     lastScanPos− − | |
|     xS = DiagScanOrder[ log2TbWidth − log2SbW ][ log2TbHeight − log2SbH ] | |
|       [ lastSubBlock ][ 0 ] | |
|     yS = DiagScanOrder[ log2TbWidth − log2SbW ][ log2TbHeight − log2SbH ] | |
|       [ lastSubBlock ][ 1 ] | |
|     xC = ( xS << log2SbW ) + DiagScanOrder[ log2SbW ][ log2SbH ][ lastScanPos ][ 0 ] | |
|     yC = ( yS << log2SbH ) + DiagScanOrder[ log2SbW ][ log2SbH ][ lastScanPos ][ 1 ] | |
|   } while( ( xC != LastSignificantCoeffX ) | | ( yC != LastSignificantCoeffY ) ) | |
|   if( lastSubBlock = = 0 && log2TbWidth >= 2 && log2TbHeight >= 2 && | |
|     !transform_skip_flag[ x0 ][ y0 ][ cIdx ] && lastScanPos > 0 ) | |
|     LfnstDcOnly = 0 | |
|   if( ( lastSubBlock > 0 && log2TbWidth >= 2 && log2TbHeight >= 2 ) | | | |
|     ( lastScanPos > 7 && ( log2TbWidth = = 2 | | log2TbWidth = = 3 ) && | |
|     log2TbWidth = = log2TbHeight ) ) | |
|     LfnstZeroOutSigCoeffFlag = 0 | |
|   if( ( LastSignificantCoeffX > 15 | | LastSignificantCoeffY > 15 ) && cIdx = = 0 ) | |
|     MtsZeroOutSigCoeffFlag = 0 | |
|   ... | |
|   } | |
| } | |

In the existing condition of LFNST signaling/parsing, two issues are observed. One issue is that when luma and chroma use different splitting trees, it fails to find transform skip flag for luma (i.e., transform_skip_flag [x0][y0][0]) when the current CU is in a chroma splitting tree (i.e., the case with treeType==DUAL_TREE_CHROMA). The other issue is caused by the extension of transform skip to chroma as disclosed in NET-P0058. The check mentioned above should be extended to include Cb and Cr checks. Some methods are proposed to handle the issues.

The proposed check is to take into consideration the condition of transform skip flag(s) of M TB(s) in the CU. For a TB with one or more transform coefficient levels not equal to 0, the transform skip flag for the TB is used to indicate if the transform operations is applied to the TB and the proposed check is used to prevent the TB from the combinations of LFNST with transform skip. As mentioned previously, in a corresponding splitting tree which can be a luma splitting tree (DUAL_TREE_LUMA), chroma splitting tree (DUAL_TREE_CHROMA), or a single splitting tree (SINGLE_TREE), there are one or more TBs in the current CU. The M TB(s) corresponds to a set of selected TBs, referred as target TBs. The condition of transform skip flag(s) of the target TB set is checked. Passing the check means that the transform skip flag(s) for all M TBs is false (i.e., the transform skip flag(s) for all M TBs is equal to 0); in other words, passing the check means the target condition (which corresponds to that all target TBs in the target TB set have a TS mode indication as false) is satisfied. In other words, the transform skip mode flag(s) condition is satisfied if none of the selected TB(s) uses the transform skip mode. After passing the check (i.e., transform skip mode flag(s) condition being satisfied), the signaling/parsing conditions for LFNST related to transform skip mode are satisfied and the syntax for LFNST can be signaled/parsed if other signaling/parsing conditions for LFNST are also satisfied.

In one embodiment, M TB(s) only include the first component in each luma/chroma splitting tree. An example of the proposed syntax table is shown as follows.

TABLE 11

An exemplary syntax table of condition signaling/parsing for LFNST according to one embodiment of the present invention.

If( Min( lfnstWidth, lfnstHeight ) >= 4 && sps_lfnst_enabled_flag = = 1 &&
   CuPredMode[ chType ][ x0 ][ y0 ] = = MODE_INTRA &&
   transform_skip_flag[ x0 ][ y0 ][ chType ] = = 0 &&
   ( treeType != DUAL_TREE_CHROMA | |
!intra_mip_flag[ x0 ][ y0 ] | |
    Min( lfnstWidth, lfnstHeight ) >= 16 ) &&
    Max( cbWidth, cbHeight ) <= MaxTbSizeY) {
    if( ( IntraSubPartitionsSplitType != ISP_NO_SPLIT | | LfnstDcOnly = = 0 ) &&
      LfnstZeroOutSigCoeffFlag = = 1 )
      lfnst_idx     ae(v)
}

In another embodiment, for a single splitting tree used for both luma and chroma components, M TB(s) include one or more components.

In one sub-embodiment, M TB(s) refers to one selected component. For example, M TB(s) refers to the first component. In another example, M TB(s) refers to Y (i.e., luma component). An exemplary syntax table according to one embodiment is shown as follows. In another example, M TB(s) can be any one component in the splitting tree.

TABLE 12

An exemplary syntax table of signaling/parsing for LFNST according to one embodiment of the present invention.

if( Min( lfnstWidth, lfnstHeight ) >= 4 && sps_lfnst_enabled_flag = = 1 &&
   CuPredMode[ chType ][ x0 ][ y0 ] == MODE_INTRA &&
   (treeType = = SINGLE_TREE &&
transform_skip_flag[ x0 ][ y0 ][ 0 ] = = 0) &&
   (treeType != DUAL_TREE_CHROMA | |
!intra_mip_flag[ x0 ][ y0 ]
    Min( lfnstWidth, lfnstHeight ) >= 16 ) &&
    Max( cbWidth, cbHeight ) <= MaxTbSizeY) {
    if( ( IntraSubPartitionsSplitType != ISP_NO_SPLIT | | LfnstDcOnly = = 0 ) &&
      LfnstZeroOutSigCoeffFlag = = 1 )
      lfnst_idx     ae(v)
}

In another embodiment, when the splitting tree is not a chroma tree (i.e., the splitting tree contains Y (i.e., luma) component), M TB(s) refers to Y (i.e., luma) TB(s). An exemplary syntax table according to one embodiment is shown as follows.

TABLE 13

An exemplary syntax table of signaling/parsing for LFNST according to one embodiment of the present invention.

```
if( Min( lfnstWidth, lfnstHeight ) >= 4 && sps_lfnst_enabled_flag = = 1
&&
    CuPredMode[ chType ][ x0 ][ y0 ] = = MODE_INTRA &&
    (treeType != DUAL_TREE_CHROMA &&
transform_skip_flag[ x0 ][ y0 ][ 0 ] = = 0)
    && (treeType != DUAL_TREE_CHROMA | |
!intra_mip_flag[ x0 ][ y0 ]
    Min( lfnstWidth, lfnstHeight ) >= 16 ) &&
    Max( cbWidth, cbHeight ) <= MaxTbSizeY) {
    if( ( IntraSubPartitionsSplitType != ISP_NO_SPLIT | | LfnstDcOnly = =
0 ) &&
        LfnstZeroOutSigCoeffFlag = = 1 )
        lfnst_idx                                                    ae(v)
}
```

In another embodiment, for a chroma splitting tree, M TB(s) include all chroma components (e.g. Cb and Cr). If any transform skip flag for the chroma components is false (i.e., transform skip flag equal to 0), the check is passed.

In another embodiment, for a luma splitting tree, M TB(s) include all components (e.g. Y). If any transform skip flag for these components is false (i.e., transform skip flag equal to 0), the check is passed. An exemplary syntax table according to this embodiment is shown in Table 14.

In another embodiment, for a single tree used for luma and chroma components, M TB(s) include all components (e.g. Y, Cb, and Cr). If any transform skip flag for these components is false (i.e., transform skip flag equal to 0), the check is passed. An exemplary syntax table according to this embodiment is shown in Table 14.

TABLE 14

An exemplary syntax table of signaling/parsing for LFNST according to one embodiment of the present invention.

```
if( Min( lfnstWidth, lfnstHeight ) >= 4 && sps_lfnst_enabled_flag = = 1
&&
    CuPredMode[ chType ][ x0 ][ y0 ] = = MODE_INTRA &&
    (treeType == DUAL_TREE_CHROMA?
(transform_skip_flag[ x0 ][ y0 ][ 1 ] = = 0 | | transform_skip_flag[ x0 ][ y0 ][ 2 ]
= = 0) : (treeType == DUAL_TREE_LUMA ?
transform_skip_flag[ x0 ][ y0 ][ 0 ] = = 0: (transform_skip_flag[ x0 ][ y0 ][ 0 ]
= = 0 | | transform_skip_flag[ x0 ][ y0 ][ 1 ] = = 0 | |
transform_skip_flag[ x0 ][ y0 ][ 2 ] = = 0))) &&
    ( treeType != DUAL_TREE_CHROMA | | !intra_mip_flag[ x0 ][ y0 ]
| |
    Min( lfnstWidth, lfnstHeight ) >= 16 ) &&
    Max( cbWidth, cbHeight ) <= MaxTbSizeY) {
    if( ( IntraSubPartitionsSplitType != ISP_NO_SPLIT | | LfnstDcOnly
= = 0 ) &&
        LfnstZeroOutSigCoeffFlag = = 1 )
        lfnst_idx                                                    ae(v)
}
``` false (i.e., all of the transform skip flags for the chroma components are equal to 0), the check is passed.

In another embodiment, for a luma splitting tree, M TB(s) include all luma components (e.g. Y). If all of the transform skip flags for these components are false (i.e., all of the transform skip flags for these components are equal to 0), the check is passed. An exemplary syntax table according to this embodiment is shown in Table 15.

In another embodiment, for a single tree used for luma and chroma components, M TB(s) include all components (e.g. Y, Cb, and Cr). If all of the transform skip flags for these components are false (i.e., transform skip flag equal to 0), the check is passed. An exemplary syntax table according to this embodiment is shown in Table 15.

In yet another embodiment, two or more of the above three embodiments can be combined. For example, the combined embodiment may only check the luma transform_skip_flag when the splitting tree is not a chroma splitting tree (e.g. not for DUAL_TREE_CHROMA) and only check the chroma transform_skip_flag when the split- In another embodiment, for a chroma splitting tree, M TB(s) include all chroma components (e.g. Cb and Cr). If all of the transform skip flags for the chroma components are ting tree is not a luma splitting tree (e.g. not for DUAL_TREE_LUMA). An exemplary syntax table according to this embodiment is shown in Table 15.

TABLE 15

An exemplary syntax table of signaling/parsing for LFNST according to one embodiment of the present invention.

```
if( Min( lfnstWidth, lfnstHeight ) >= 4 && sps_lfnst_enabled_flag = = 1
&&
    CuPredMode[ chType ][ x0 ][ y0 ] = = MODE_INTRA &&
    (treeType = = DUAL_TREE_CHROMA?
(transform_skip_flag[ x0 ][ y0 ][ 1 ] = = 0 &&
transform_skip_flag[ x0 ][ y0 ][ 2 ] = = 0) : (treeType = =
DUAL_TREE_LUMA ? transform_skip_flag[ x0 ][ y0 ][ 0 ] = = 0:
(transform_skip_flag[ x0 ][ y0 ][ 0 ] = = 0 && transform_skip_flag[ x0 ][ y0 ][ 1 ]
= = 0 && transform_skip_flag[ x0 ][ y0 ][ 2 ] = = 0))) &&
    ( treeType != DUAL_TREE_CHROMA | | !intra_mip_flag[ x0 ][ y0 ] | |
        Min( lfnstWidth, lfnstHeight ) >= 16 ) &&
    Max( cbWidth, cbHeight ) <= MaxTbSizeY) {
    if( ( IntraSubPartitionsSplitType != ISP_NO_SPLIT | | LfnstDcOnly = =
0 ) &&
        LfnstZeroOutSigCoeffFlag = = 1 )
        lfnst_idx                                              ae(v)
}
```

Another exemplary syntax table for the combination of the above three embodiments is shown in Table 16.

TABLE 16

An exemplary syntax table of signaling/parsing for LFNST according to one embodiment of the present invention.

```
if( Min( lfnstWidth, lfnstHeight ) >= 4 && sps_lfnst_enabled_flag == 1
&&CuPredMode[ chType ][ x0 ][ y0 ] = = MODE_INTRA &&
(treeType == DUAL_TREE_CHROMA | | transform_skip_flag[ x0 ][ y0 ][ 0 ]
= = 0) &&
(treeType == DUAL_TREE_LUMA | | (transform_skip_flag[ x0 ][ y0 ][ 1 ] = =
0 &&
transform_skip_flag[ x0 ][ y0 ][ 2 ] = = 0)) && ( treeType = =
DUAL_TREE_CHROMA | |
!intra_mip_flag[ x0 ][ y0 ] | |Min( lfnstWidth, lfnstHeight ) >= 16 ) &&
Max( cbWidth, cbHeight ) <= MaxTbSizeY) {
    if( ( IntraSubPartitionsSplitType != ISP_NO_SPLIT | | LfnstDcOnly
= = 0 ) &&
        LfnstZeroOutSigCoeffFlag = = 1 )
        lfnst_idx                                              ae(v)
    }
```

In another embodiment, the check is not passed, the syntax for LFNST (e.g., LFNST index) is not signaled/parsed.

In one sub-embodiment, the syntax for LFNST (LFNST index) is inferred to be 0 (i.e., LFNST not applied).

In another embodiment, one bitstream conformance is required to handle the case if the check is not passed. The bitstream conformance is as follows. It is a requirement of bitstream conformance that the value of lfnst_index shall not be larger than 0 when the check is not passed.

In the following, an example of bitstream conformance is illustrated for the case of checking "the transform skip flag (s) for M TB(s), where M TB(s) means only the first component in each luma/chroma splitting tree". The requirement of bitstream conformance corresponds to that the value of lfnst index shall not be larger than 0 when the value of transform skip flag for the first component in each of luma/chroma splitting tree (e.g., transform_skip_flag[x0][y0][chType], where if treeType=DUAL_TREE_CHROMA, chType indicates 1 (i.e., Cb); otherwise, chType indicates 0 (i.e., Y)) is greater than 1.

In another embodiment, a variable can be created in the draft text or software to record whether to signal/parse the syntax for LFNST. The value of this variable is updated according to one or more existing signaling/parsing conditions for LFNST and/or one or more proposed checks in this invention. For example, this variable is initialized with 1 and if any existing signaling/parsing condition for LFNST and/or one or more proposed checks in this invention is not satisfied, this variable is changed to 0 and the syntax for LFNST is not signaled/parsed.

In another embodiment, a unification checking mechanism is used for different splitting trees for luma and chroma. For example, when the luma and chroma use dual trees (i.e., separate splitting trees), the luma CU is in a luma splitting tree and the chroma CU is in a chroma splitting tree. The unification mechanism is that LFNST is disabled if any one of the transform skip flag (s) for all components in the current CU is using transform skip.

Due to the current size constraint to LFNST, LFNST can be applied when one CU/CB contains one TU/TB. The check can take into account of the transform skip flag for one TU/TB instead of multiple TUs/TBs. When one CU/CB contains multiple TUs/TBs, the proposed check is according to one or more TUs/TBs in that CU/CB. In one embodiment, the proposed check is according to all TUs/TBs in that CU/CB. In another embodiment, the check is according to any one of the TUs/TBs in that CU/CB (e.g. the first TU/TB or the last TU/TB). For example, in a luma splitting tree, the target TB set comprises the first luma TB for the luma CB in the current CU. For another example, in a chroma splitting tree, the target TB set comprises the first Cb TB for the Cb CB in the current CU and the first Cr TB for the Cr CB in the current CU. For another example, in a single splitting tree, the target TB set comprises the first luma TB for the luma CB in the current CU, the first Cb TB for the Cb CB in the current CU, and the first Cr TB for the Cr CB in the current CU. In another embodiment, the check is according to any subset of the TUs/TBs in that CU/CB.

Moreover, the usage of LFNST can be limited under some conditions. In the current design, LFNST is applied for intra CU in both intra and inter slices, and luma and/or chroma. If a dual tree is enabled, LFNST indices for luma and chroma are signaled/parsed separately. For inter slice, where the dual tree is disabled, a single LFNST index is signaled/parsed and used for Luma and/or chroma. In this invention, chroma LFNST is disabled under some cases.

In one embodiment, for a single tree, chroma LFNST is disabled.

In one sub-embodiment, when chroma LFNST is disabled, the LFNST index is still signaled/parsed and can be used for luma.

In another embodiment, chroma LFNST is disabled.

In one sub-embodiment, when chroma LFNST is disabled, the LFNST index is not signaled/parsed in the chroma dual tree.

In another embodiment, LFNST cannot be used for a TB even though the LFNST index for the CU containing the TB is larger than zero. A variable, applyLfnstFlag, is created to indicate whether LFNST can be used or not. If applyLfnstFlag is equal to 0, LFNST cannot be used. If applyLfnstFlag is equal to 1, LFNST can be used.

For example, for a single tree, chroma LFNST is disabled. The variable applyLfnstFlag is derived as follows: (where xTbY and yTbY means the corresponding luma sample location for the TB, cIdx refers to the component for the TB (e.g. cIdx equal to 0 referring to luma component, cIdx equal to 1 referring to Cb component, and cIdx equal to 2 referring to Cr component), lfnst_idx is the LFNST index for the CU, and nTbW and nTbH means the width and height of the TB)

If (1) treeType is equal to SINGLE_TREE, (2) lfnst_idx is not equal to 0, (3) transform_skip_flag[xTbY][yTbY][cIdx] is equal to 0, (4) cIdx is equal to 0 and (5) both nTbW and nTbH are greater than or equal to 4, applyLfnstFlag is set to 1. (Any subset of (1) to (5) can be used in this condition)

Otherwise, if (1) treeType is not equal to SINGLE_TREE, (2) lfnst_idx is not equal to 0, (3) transform_skip_flag[xTbY][yTbY][cIdx] is equal to 0 and (4) both nTbW and nTbH are greater than or equal to 4, applyLfnstFlag is set to 1. (Any subset of (1) to (4) can be used in this condition)

Otherwise, applyLfnstFlag is set to 0.

For another example, chroma LFNST is disabled. The variable applyLfnstFlag is derived as follows:

If (1) lfnst_idx is not equal to 0, (2) transform_skip_flag [xTbY][yTbY][cIdx] is equal to 0, (3) cIdx is equal to 0 and (4) both nTbW and nTbH are greater than or equal to 4, applyLfnstFlag is set to 1. (Any subset of 1 to 4 can be used in this condition)

Otherwise, applyLfnstFlag is set to 0.

In another sub-embodiment, applyLfnstFlag can be used in one or more LFNST-related sections. For example, the LFNST index is referenced in a corresponding section in the draft standard.

8.7.4 Transformation process for scaled transform coefficients

. . . When applyLfnstFlag is equal to 1 //lfnst_idx is not equal to 0 and transform_skip_flag[xTbY][yTbY][cIdx] is equal to 0 and both nTbW and nTbH are greater than or equal to 4//, the following applies: . . . .

In the above modified texts based on the draft standard, the texts enclosed by a pair of "//" indicate deleted texts.

8.7.3 Scaling process for transform coefficients

. . . For the derivation of the scaled transform coefficients d[x][y] with x=0 . . . nTbW−1, y=0 . . . nTbH−1, the following applies:

The intermediate scaling factor m[x][y] is derived as follows:

If one or more of the following conditions are true, m[x][y] is set equal to 16:

sps_scaling_list_enabled_flag is equal to 0.

pic_scaling_list_present_flag is equal to 0.

transform_skip_flag[xTbY][yTbY][cIdx] is equal to 1.

scaling_matrix_for_lfnst_disabled_flag is equal to 1 and applyLfnstFlag is equal to 1 //lfnst_idx[xTbY][yTbY] is not equal to 0// . . . .

In the above modified texts based on the draft standard, the texts enclosed by a pair of "//" indicate deleted texts.

In another embodiment, when chroma LFNST is disabled in some cases, LfnstDcOnly, which is initialized as 1 before parsing each TB in one CU and is changed to 0 if any TB in that CU has any significant coefficients (or the last significant coefficient) located at the position larger than DC position, is not updated in the no-LFNST TBs. For example, chroma LFNST is disabled for a single tree. Then, no-LFNST TBs include chroma TBs for a single tree. An example of the corresponding changes in the syntax table is shown as follows.

TABLE 17

An exemplary syntax table of signaling/parsing for LFNST according to one embodiment of the present invention.

| | Descriptor |
|---|---|
| Residual_coding( x0, y0, log2TbWidth, log2TbHeight, cIdx ) {... | |
|   if( lastSubBlock = = 0 && log2TbWidth >= 2 && log2TbHeight >= 2 && | |
|     !transform_skip_flag[ x0 ][ y0 ][ cIdx ] && lastScanPos > 0 && | |
|   ( (cIdx == 0) || | |
|     (treeType != SINGLE_TREE)) ) | |
|     LfnstDcOnly = 0 | |
|   if( ( lastSubBlock > 0 && log2TbWidth >= 2 && log2TbHeight >= 2 ) || | |

TABLE 17-continued

An exemplary syntax table of signaling/parsing for LFNST
according to one embodiment of the present invention.

Descriptor

```
( lastScanPos > 7 && ( log2TbWidth = = 2 | | log2TbWidth = = 3 )
&&
  log2TbWidth = = log2TbHeight ) )
  LfnstZeroOutSigCoeffFlag = 0
...}
```

In another example, chroma LFNST is disabled and no-LFNST TBs include chroma TBs. An example of the corresponding changes in the syntax table is shown as follows.

TABLE 18

An exemplary syntax table of signaling/parsing for LFNST
according to one embodiment of the present invention.

Descriptor

```
residual_coding( x0, y0, log2TbWidth, log2TbHeight, cIdx ) {...
  if( lastSubBlock = = 0 && log2TbWidth >= 2 && log2TbHeight
>= 2 &&
    !transform_skip_flag[ x0 ][ y0 ][ cIdx ] && lastScanPos > 0 &&
( cIdx = 0) )
      LfnstDcOnly = 0
  if( ( lastSubBlock > 0 && log2TbWidth >= 2 &&
log2TbHeight >= 2 ) | |
      ( lastScanPos > 7 && ( log2TbWidth = = 2 | | log2TbWidth = =
3 ) &&
        log2TbWidth = = log2TbHeight ) )
        LfnstZeroOutSigCoeffFlag = 0
...}
```

When a TB has no cbf, no transform process needs to be applied. However, the LFNST index may still be signaled/parsed in this case. For example, for a single tree, when luma contains no cbf, but chroma meets the LFNST signaling/parsing condition (e.g. chroma is not transform skip and has coefficients located at non-DC position), LFNST index can be signaled/parsed. In this case, LFNST index is signaled/parsed and always has a value of 0, since LFNST is applied to luma for a single tree and the index is a redundancy.

In one embodiment, LfnstDcOnlyFlag is updated by Y only (the to-be-applied-LFNST TB) for a single tree.

In another embodiment, LfnstDcOnlyFlag is separated into LfnstDCOnlyLumaFlag and lfnstDCOnlychromaFlag. LfnstDCOnlyLumaFlag is updated by Y TB and lfnstDCOnlychromaFlag is updated by Cb or Cr TB(s).

In one sub-embodiment, for single tree, only LfnstDCOnlyLumaFlag is considered for LFNST signaling/parsing.

In another sub-embodiment, for luma dual tree, only LfnstDCOnlyLumaFlag is considered for LFNST signaling/parsing.

In another sub-embodiment, for chroma dual tree, only LfnstDCOnlychromaFlag is considered for LFNST signaling/parsing.

In another embodiment, a check is added for LFNST signaling as follows. If luma has no Cbf, LFNST index is not signaled/parsed. An example of the syntax table is shown as follows.

TABLE 19

An exemplary syntax table of signaling/parsing for LFNST
according to one embodiment of the present invention.

```
lfnstNotTsFlag =
    ( treeType = = DUAL_TREE_CHROMA | |
transform_skip_flag[ x0 ][ y0 ][ 0 ] = = 0 ) &&
    ( treeType = = DUAL_TREE_LUMA | | ( transform_skip_flag[ x0 ][ y0 ][ 1 ]
= = 0 &&
      transform_skip_flag[ x0 ][ y0 ][ 2 ] = = 0 ) )
  if( Min( lfnstWidth, lfnstHeight ) >= 4 && sps_lfnst_enabled_flag = = 1 &&
    CuPredMode[ chType ][ x0 ][ y0 ] = = MODE_INTRA && lfnstNotTsFlag
= = 1 &&
    ( treeType = = DUAL_TREE_CHROMA | | !intra_mip_flag[ x0 ][ y0 ] | |
      Min( lfnstWidth, lfnstHeight ) >= 16 ) && Max( cbWidth, cbHeight )
<= MaxTbSizeY) {
    if( ( IntraSubPartitionsSplitType != ISP_NO_SPLIT | | LfnstDcOnly = = 0 )
&&
      LfnstZeroOutSigCoeffFlag = = 1 )
```

TABLE 19-continued

An exemplary syntax table of signaling/parsing for LFNST
according to one embodiment of the present invention.

```
    if (treeType = = DUAL_TREE_CHROMA || tu_cbf_luma[x0][y0])
lfnst_idx
    }
```

In one sub-embodiment, this check is added at the CU-level check.

In another sub-embodiment, this check is added at the TB-level check.

In another sub-embodiment, this check is performed for single tree as shown in the following example.

TABLE 20

An exemplary syntax table of signaling/parsing for LFNST
according to one embodiment of the present invention.

```
lfnstNotTsFlag =
    ( treeType = = DUAL_TREE_CHROMA || transform_skip_flag[ x0 ][ y0 ][ 0 ]
= = 0 ) &&
    ( treeType = = DUAL_TREE_LUMA || ( transform_skip_flag[ x0 ][ y0 ][ 1 ]
= = 0 &&
    transform_skip_flag[ x0 ][ y0 ][ 2 ] = = 0 ) )
  if( Min( lfnstWidth, lfnstHeight ) >= 4 && sps_lfnst_enabled_flag = = 1 &&
    CuPredMode[ chType ][ x0 ][ y0 ] = = MODE_INTRA && lfnstNotTsFlag = =
1 &&
    ( treeType = = DUAL_TREE_CHROMA || !intra_mip_flag[ x0 ][ y0 ] ||
    Min( lfnstWidth, lfnstHeight ) >= 16 ) && Max( cbWidth, cbHeight ) <=
MaxTbSizeY) {
      if( ( IntraSubPartitionsSplitType != ISP_NO_SPLIT || LfnstDcOnly = =
0 ) &&
        LfhstZeroOutSigCoeffFlag = = 1 )
      if (treeType ! = SINGLE_TREE || tu_cbf_luma[x0][y0])   lfnst_idx
      }
```

In another sub-embodiment, this check is not limited to the ISP mode. The reason is described as follows. When ISP is applied, one luma CB is partitioned into multiple TBs (e.g. 4 TBs) and at least one significant coefficient is contained inside a TB (the TBs containing significant coefficients can be any one or more TBs inside this CU). Examples of the syntax table are shown as follows.

TABLE 21A

An exemplary syntax table of signaling/parsing for LFNST
according to one embodiment of the present invention.

```
lfnstNotTsFlag =
    ( treeType = = DUAL_TREE_CHROMA ||
transform_skip_flag[ x0 ][ y0 ][ 0 ] = = 0 ) &&
    ( treeType = = DUAL_TREE_LUMA || ( transform_skip_flag[ x0 ][ y0 ][ 1 ]
= = 0 &&
    transform_skip_flag[ x0 ][ y0 ][ 2 ] = = 0 ) )
  if( Min( lfnstWidth, lfnstHeight ) >= 4 && sps_lfnst_enabled_flag = = 1 &&
    CuPredMode[ chType ][ x0 ][ y0 ] = = MODE_INTRA && lfnstNotTsFlag
= = 1 &&
    ( treeType = = DUAL_TREE_CHROMA || !intra_mip_flag[ x0 ][ y0 ]
    Min( lfnstWidth, lfnstHeight ) >= 16 ) && Max( cbWidth, cbHeight ) <=
MaxTbSizeY) {
    if( ( IntraSubPartitionsSplitType != ISP_NO_SPLIT || LfnstDcOnly = = 0 )
&&
        LfnstZeroOutSigCoeffFlag = = 1 )
      if (treeType != SINGLE_TREE || (tu_cbf_luma[x0][y0] ||
IntraSubPartitionsSplitType ! =
        ISP_NO_SPLIT))   lfnst_idx
      }
```

TABLE 21B

An exemplary syntax table of signaling/parsing for LFNST
according to one embodiment of the present invention.

```
lfnstNotTsFlag =
    ( treeType = = DUAL_TREE_CHROMA | | transform_skip_flag[ x0 ][ y0 ][ 0 ]
= = 0 )&&
    ( treeType = = DUAL_TREE_LUMA | | ( transform_skip_flag[ x0 ][ y0 ][ 1 ]
= = 0 &&
    transform_skip_flag[ x0 ][ y0 ][ 2 ] = = 0 ) )
    if( Min( lfnstWidth, lfnstHeight ) >= 4 && sps_lfnst_enabled_flag = = 1 &&
    CuPredMode[ chType ][ x0 ][ y0 ] = = MODE_INTRA && lfnstNotTsFlag
= = 1 &&
    ( treeType = = DUAL_TREE_CHROMA | | !intra_mip_flag[ x0 ][ y0 ]
    Min( lfnstWidth, lfnstHeight ) >= 16 ) && Max( cbWidth, cbHeight ) <=
MaxTbSizeY) {
    if( ( IntraSubPartitionsSplitType != ISP_NO_SPLIT | | (LfnstDcOnly = = 0
&&
        (treeType ! = SINGLE_TREE || tu_cbf_luma[x0][y0] )) &&
        LfnstZeroOutSigCoeffFlag = = 1 )
        lfnst_idx
    }
```

TABLE 21C

An exemplary syntax table of signaling/parsing for LFNST
according to one embodiment of the present invention.

```
lfnstNotTsFlag =
    ( treeType = = DUAL_TREE_CHROMA | | transform_skip_flag[ x0 ][ y0 ][ 0 ]
= = 0 ) &&
    ( treeType = = DUAL_TREE_LUMA | | ( transform_skip_flag[ x0 ][ y0 ][ 1 ]
= = 0 &&
    transform_skip_flag[ x0 ][ y0 ][ 2 ] = = 0 ) )
    if( Min( lfnstWidth, lfnstHeight ) >= 4 && sps_lfnst_enabled_flag = = 1 &&
    CuPredMode[ chType ][ x0 ][ y0 ] = = MODE_INTRA && lfnstNotTsFlag
= = 1 &&
    ( treeType = = DUAL_TREE_CHROMA | | !intra_mip_flag[ x0 ][ y0 ] | |
    Min( lfhstWidth, lfnstHeight ) >= 16 ) && Max( cbWidth, cbHeight ) <=
MaxTbSizeY) {
    if( ( IntraSubPartitionsSplitType != ISP_NO_SPLIT | | (LfnstDcOnly = = 0
&&
        ( !( treeType == SINGLE_TREE && tu_cbf_luma[x0][y0])) ) &&
        LfnstZeroOutSigCoeffFlag = = 1 )
        lfnst_idx
    }
```

In Tables 20 and 21A-C above, lfnstNotTsFlag is a flag, where if lfnstNotTsFlag is equal to 1, LFNST mode can be applied (assuming that other enabling conditions of LFNST are satisfied.) Otherwise, (i.e., lfnstNotTsFlag is equal to 0), LFNST mode cannot be applied (i.e., LFNST syntax is inferred as disabled).

In another sub-embodiment, this check is performed for luma dual tree.

In one embodiment, when the lfnst index>0 (i.e., lfnst being performed), LFNST is applied to the first available component in a splitting tree. LFNST is not applied to the remaining components.

In one sub-embodiment, the first available component is the first component which contains cbf. For example, for dual-tree chroma, if cb contains significant coefficients, the first available component is Cb; otherwise if Cb cbf=0 and Cr contains significant coefficients, the first available component is Cr; otherwise if Cb and Cr contain no significant coefficient, lfnst is not applied (i.e., the lfnst index inferred to be 0 without signaling). For another example, lfnst is applied to luma, for single tree. In this case, if luma contains significant coefficients, the first available component is luma; otherwise, lfnst is not applied.

In another embodiment, when the JCCR mode is activated, one single joint chroma residual block (resJointC[x][y] in Table 7) is signaled/parsed, so lfnst can be applied to that single block (i.e., LFNST affecting both Cb and Cr).

In another embodiment, lfnst is signaled/parsed at the first available TB.

In one sub-embodiment, the first available TB is the first TB which contains cbf. For example, for DUAL_TREE_CHROMA, if cb contains significant coefficients, the first available TB is Cb; otherwise if Cb cbf=0 and Cr contains significant coefficients, the first available TB is Cr; otherwise if Cb and Cr contain no significant coefficient, lfnst is not applied (i.e., the lfnst index inferred to be 0 without signaling). For another example, lfnst is applied to luma. For single tree, if luma contains significant coefficients, the first available component is luma; otherwise, lfnst is not signaled/parsed.

In another sub-embodiment, when joint coding of chrominance residuals (JCCR) is applied, for DUAL_TREE_CHROMA, the first available TB is the chroma TB that the residuals of which are used to derive the residuals for the other chrom component. LFNST can be viewed as being applied to both chroma components. For example, for DUAL_TREE_CHROMA, if tu_cbf_cb[x0][y0]>0 and tu cbf cr[x0][y0]=0 (the residuals of Cr being derived from Cb and the residual-associated information of Cb being signaled), the first available TB is Cb. For another example, for dual tree chroma, if tu_cbf_cb[x0][y0]=0 and tu cbf cr[x0][y0]>0 (the residuals of Cb being derived from Cr and the residual-associated information of Cr being signaled), the first available TB is Cr. For another example, for DUAL_TREE_CHROMA, if tu_cbf_cb[x0][y0]>0 and tu cbf cr[x0][y0]>0 (the residuals of Cr being derived from Cb and the residual-associated information of Cb being signaled), the first available TB is Cb.

In another sub-embodiment, the lfnst index is signaled/parsed at the end of the first available TB. For example, the lfnst index is parsed after parsing the residuals for each subblock (coding group or 4×4 subblock) in that TB.

In another sub-embodiment, the lfnst index is signaled/parsed after signaling/parsing the significant flag of that TB. The signaling/parsing conditions for LFNST (e.g. LfnstDcOnlyFlag or LfnstZeroOutSigCoeffFlag) depend on the information of the first available TB only.

In another embodiment, for single tree, lfnst is applied to luma only. When luma cannot apply lfnst (e.g. luma containing no cbf), the lfnst index is not signaled/parsed even though chroma is available for signaling/parsing lfnst (e.g. chroma containing cbf or JCCR being used for chroma).

When a TB has no cbf, no transform process is need. However, transform skip (TS) flag may be equal to 1 in this case. For example, for a BDPCM block, the transform skip flag is inferred to be 1. However, this BDPCM block may contain no cbf. When considering LFNST signaling/parsing, the TB without cbf is viewed as a TS block and LFNST index cannot be signaled/parsed since LFNST is not allowed for a TS block. Some methods are proposed to prevent these unexpected cases.

In one embodiment, when consider signaling/parsing a LFNST index, Coded Block Flag (CBF) indication is used to prevent disallowing LFNST for a CU containing one or more TBs which have one or more TS flags not equal to 0 but are not actually performed with TS process. First, a Coded block flag (CBF) indication for the current CU is checked. the CBF indication of the current CU is denoted as cu coded flag (or cu cbf).

cu_coded_flag equal to 1 specifies that the transform tree( ) syntax structure is present for the current coding unit. cu coded flag equal to 0 specifies that the transform tree( ) syntax structure is not present for the current coding unit.

When cu_coded_flag is not present, it is inferred as follows:

If cu skip flag[x0][y0] is equal to 1 or pred_mode_plt_flag is equal to 1, cu_coded_flag is inferred to be equal to 0.

Otherwise, cu_coded_flag is inferred to be equal to 1.

If the CBF indication for the current CU is true, the following checks of one or more indications for one or more target TBs are needed; otherwise, LFNST syntax is inferred as disabled.

In one embodiment, when considering signaling/parsing an LFNST index, in addition to checking the CBF indication for the current CU, tu_cbf is also checked. Therefore, for a TB with TS flag equal to 1, if this TB contains no cbf, it will not be viewed as a TS block for LFSNT signaling/parsing. The lfnstNotTsFlag is updated as follows:

lfnstNotTsFlag=(treeType==DUAL_TREE_CHROMA||
(transform_skip_flag[x0][y0][0]==0 !tu_cbf_luma[x0][y0])) && (treeType==DUAL_TREE_LUMA
((transform_skip_flag[x0][y0][1]==0||!tu_cbf_cb[x0][y0]) &&
(transform_skip_flag[x0][y0][2]==0||!tu cbf cr[x0][y0])))

The derivation of lfnstNotTsFlag as shown above is based on at least one of the two factors: TS mode indication being false and CBF indication being false. LFNST mode is allowed for the current CU if each target TB satisfies at least one of factor 1 and factor 2. Allowing LFNST mode for the current CU means that if other enabling conditions of LFNST are satisfied, LFNST syntax is signalled/parsed to indicate whether the LFNST mode is applied to the current CU and/or which LFNST kernel is applied when the LFNST mode is applied. The TS mode indication depends on the transform skip (TS) flag. The CBF indication depends on the coded block flag (cbf) for a target TB. Cbf for Y, Cb, and Cr can be represented by tu_y_coded_flag (or tu_cbf_luma), tu_cb_coded_flag (or tu_cbf_cb) and tu cr coded flag (or tu_cbf cr).

tu_cb_coded_flag[x0][y0] equal to 1 specifies that the Cb transform block contains one or more transform coefficient levels not equal to 0. The array indices x0 and y0 specify the location (x0, y0) of the top-left luma sample of the considered transform block relative to the top-left luma sample of the picture.

When tu_cb_coded_flag[x0][y0] is not present, its value is inferred to be equal to 0.

tu_cr_coded_flag[x0][y0]equal to 1 specifies that the Cr transform block contains one or more transform coefficient levels not equal to 0. The array indices x0, y0 specify the location (x0, y0) of the top-left luma sample of the considered transform block relative to the top-left luma sample of the picture.

When tu_cr_coded_flag[x0][y0] is not present, its value is inferred to be equal to 0.

tu_y_coded_flag[x0][y0]equal to 1 specifies that the luma transform block contains one or more transform coefficient levels not equal to 0. The array indices x0, y0 specify the location (x0, y0) of the top-left luma sample of the considered transform block relative to the top-left luma sample of the picture.

When tu_y coded flag[x0][y0] is not present and treeType is not equal to DUAL_TREE_CHROMA, its value is inferred as follows:
 If cu_sbt_flag is equal to 1 and one of the following conditions is true, tu_y_coded_flag[x0][y0] is inferred to be equal to 0:
 subTuIndex is equal to 0 and cu sbtpos flag is equal to 1;
 subTuIndex is equal to 1 and cu sbtpos flag is equal to 0.
 Otherwise, tu_y_coded_flag[x0][y0] is inferred to be equal to 1.

For example, in a luma splitting tree:
 If the TS flag for a target luma TB is equal to 0, lfnstNotTsFlag is set as 1.
 If the target luma TB contains no significant coded data (CBF indications equal to false), lfnstNotTsFlag is set as 1.
 Other: lfnstNotTsFlag is set as 0.

For another example, in a chroma splitting tree:
 If the TS flags for all the target Cb and Cr TBs are equal to 0, lfnstNotTsFlag is set as 1.
 If "all target TBs contain no significant coded data", lfnstNotTsFlag is set as 1.
 If "each TS target TB (TS target TB=target TB with the TS flag unequal to 0) contains no significant coded data", lfnstNotTsFlag is set as 1.
 Other: lfnstNotTsFlag is set as 0.

For another example, in a single splitting tree:
If the TS flags for all the target luma, Cb, and Cr TBs are equal to 0, lfnstNotTsFlag is set as 1.
If "all target TBs contain no significant coded data", lfnstNotTsFlag is set as 1.
If "each TS target TB (TS target TB=target TB with the TS flag unequal to 0) contains no significant coded data", lfnstNotTsFlag is set as 1.
Otherwise, lfnstNotTsFlag is set as 0.

In one embodiment, the target TBs correspond to one or more TBs with Transform Skip (TS) flags not equal to 0.

In one embodiment, in a luma splitting tree, the current CU corresponds to a luma coding block, and said one or more target TBs correspond to one or more luma TBs. In another embodiment, in a chroma splitting tree, the current CU corresponds to one or more chroma coding blocks, and said one or more target TBs correspond to one or more chroma TBs. For example, the chroma coding blocks are Cb and Cr coding blocks, and the chroma TBs are Cb and Cr TBs. In yet another embodiment, in a single splitting tree, the current CU corresponds to one luma coding block and one or more chroma coding blocks, and said one or more target TBs correspond to one or more luma TBs and one or more chroma TBs. For example, the chroma coding blocks are Cb and Cr coding blocks, and the chroma TBs are Cb and Cr TBs.

In one embodiment, the target TBs correspond to a predefined TB for each coding block in the current CU. For example, the predefined TB corresponds to the first TB for each coding block in the current CU. The location of the first TB can be the location of the top-left luma sample of the considered transform block. The location of the first TB can be the location of the top-left luma sample of the considered coding block (the considered CB in the current CU) relative to the top-left luma sample of the picture.

In one embodiment, if all CBF indications for the target TBs are false, the LFNST mode is allowed for the current CU (regardless of TS checking). In another embodiment, if all CBF indications for the target TBs with Transform Skip (TS) flags not equal to 0 are false, the LFNST mode is allowed for the current CU. In yet another embodiment, if any one of the CBF indications for the target TBs with Transform Skip (TS) flags not equal to 0 is true, the LFNST mode is disallowed for the current CU.

In another embodiment, when the block contains no cbf (cbf equal to false), the TS flag will not be 1. For example, if a BDPCM block has no cbf, its TS flag will not be inferred to 1. An example of the modified semantics according to one embodiment of the present invention is shown below.

When transform_skip_flag[x0][y0][cIdx] is not present, it is inferred as follows:
If BdpcmFlag[x0][y0][cIdx] is equal to 1, transform_skip_flag[x0][y0][cIdx] is inferred as follows
If cIdx=0 and tu cbf luma[x0][y0]=1, transform_skip_flag [x0][y0][cIdx] is inferred to be equal to 1.
Otherwise if cIdx=1 and tu_cbf_cb[x0][y0]=1, transform_skip_flag[x0][y0][cIdx] is inferred to be equal to 1.
Otherwise if cIdx=1 and tu cbf cr[x0][y0]=1, transform_skip_flag[x0][y0][cIdx] is inferred to be equal to 1.
Otherwise, transform_skip_flag[x0][y0][cIdx] is inferred to be equal to 0.

In another embodiment, when chroma LFNST is disabled in some cases, LfnstZeroOutSigCoeffFlag, which is initialized as 1 before parsing each TB in one CU and is changed to 0 if any TB in that CU has any significant coefficients (or the last significant coefficient) located at the LFNST zero-out region, is not updated in the no-LFNST TBs. For example, chroma LFNST is disabled for a single tree. Then, no-LFNST TBs include chroma TBs for a single tree. An example of the corresponding changes in the syntax table is shown as follows.

TABLE 22

An exemplary syntax table of signaling/parsing for LFNST according to one embodiment of the present invention.

| | Descriptor |
|---|---|

```
residual_coding( x0, y0, log2TbWidth, log2TbHeight, cIdx ) {...
  if( lastSubBlock = = 0 && log2TbWidth >= 2 && log2TbHeight
>= 2 &&
    !transform_skip_flag[ x0 ][ y0 ][ cIdx ] && lastScanPos > 0 )
    LfnstDcOnly = 0
  if( ( lastSubBlock > 0 && log2TbWidth >= 2 && log2TbHeight >= 2 )
| |
    ( lastScanPos > 7 && ( log2TbWidth = = 2 | | log2TbWidth = = 3 )
&&
    log2TbWidth = = log2TbHeight ) && ( ( cIdx == 0) || (treeType !=
SINGLE_TREE)))
    LfnstZeroOutSigCoeffFlag = 0
...}
```

In another example, chroma LFNST is disabled and no-LFNST TBs include chroma TBs. An example of the corresponding changes in the syntax table is shown as follows.

TABLE 23

An exemplary syntax table of signaling/parsing for LFNST according to one embodiment of the present invention.

| | Descriptor |
|---|---|
| Residual_coding( x0, y0, log2TbWidth, log2TbHeight, cIdx ) {...<br>  if( lastSubBlock = = 0 && log2TbWidth >= 2 && log2TbHeight >= 2 &&<br>    !transform_skip_flag[ x0 ][ y0 ][ cIdx ] && lastScanPos > 0 )<br>    LfnstDcOnly = 0<br>  if( ( lastSubBlock > 0 && log2TbWidth >= 2 && log2TbHeight >= 2 ) \|\|<br>    ( lastScanPos > 7 && ( log2TbWidth = = 2 \|\| log2TbWidth = = 3 ) &&<br>    log2TbWidth = = log2TbHeight ) &&( cIdx = 0 ) )<br>    LfnstZeroOutSigCoeffFlag = 0<br>...} | |

Based on Table 15, which means only check the luma transform_skip_flag when coding luma TUs (e.g. not for DUAL_TREE_CHROMA) and only check the chroma transform_skip_flag when coding chroma TUs (e.g. not for DUAL_TREE_LUMA), chroma LFNST is disabled under some cases. For example, for a single tree, chroma LFNST is disabled. An example of the proposed syntax table is shown as follows.

TABLE 24

An exemplary syntax table of signaling/parsing for LFNST according to one embodiment of the present invention.

| |
|---|
| if( Min( lfnstWidth, lfnstHeight ) >= 4 && sps_lfnst_enabled_flag = = 1 &&<br>  CuPredMode[ chType ][ x0 ][ y0 ] = = MODE_INTRA &&<br>  (treeType == DUAL_TREE_CHROMA?<br>(transform_skip_flag[ x0 ][ y0 ][ 1 ] = = 0 &&<br>  transform_skip_flag[ x0 ][ y0 ][ 2 ] = = 0):<br>(transform_skip_flag[ x0 ][ y0 ][ 0 ] = = 0)) &&<br>  ( treeType != DUAL_TREE_CHROMA \|\| !intra_mip_flag[ x0 ][ y0 ] \|\|<br>    Min( lfnstWidth, lfnstHeight ) >= 16 ) &&<br>  Max( cbWidth, cbHeight ) <= MaxTbSizeY) {<br>  if( ( IntraSubPartitionsSplitType != ISP_NO_SPLIT \|\| LfnstDcOnly = = 0 ) &&<br>    LfnstZeroOutSigCoeffFlag = = 1 )<br>    lfnst_idx         ae(v)<br>} | |

Another example of the proposed syntax table based on Table 16 is also represented as follows.

TABLE 25

An exemplary syntax table of signaling/parsing for LFNST according to one embodiment of the present invention.

| |
|---|
| if( Min( lfnstWidth, lfnstHeight ) >= 4 && sps_lfnst_enabled_flag == 1 &&<br>  CuPredMode[ chType ][ x0 ][ y0 ] = = MODE_INTRA &&<br>  (treeType == DUAL_TREE_CHROMA \|\| transform_skip_flag[ x0 ][ y0 ][ 0 ] = = 0) && (treeType != DUAL_TREE_CHROMA \|\|<br>(transform_skip_flag[ x0 ][ y0 ][ 1 ] = = 0 &&<br>  transform_skip_flag[ x0 ][ y0 ][ 2 ] = = 0)) &&<br>  ( treeType = = DUAL_TREE_CHROMA \|\| !intra_mip_flag[ x0 ][y0 ]<br>  Min( lfnstWidth, lfnstHeight ) >= 16 ) &&<br>  Max( cbWidth, cbHeight ) <= MaxTbSizeY) {<br>  if( ( IntraSubPartitionsSplitType != ISP_NO_SPLIT \|\| LfnstDcOnly = = 0 ) &&<br>    LfnstZeroOutSigCoeffFlag = = 1 )<br>    lfnst_idx         ae(v)<br>} | |

In another example, chroma LFNST is disabled. The proposed syntax table is shown as follows. An example of the proposed syntax table is shown as follows.

TABLE 26

An exemplary syntax table of signaling/parsing for LFNST according to one embodiment of the present invention.

```
if( Min( lfnstWidth, lfnstHeight ) >= 4 && sps_lfnst_enabled_flag = = 1 &&
   CuPredMode[ chType ][ x0 ][ y0 ] = = MODE_INTRA &&
   (treeType != DUAL_TREE_CHROMA &&
(transform_skip_flag[ x0 ][ y0 ][ 0 ] = = 0)) &&
   ( treeType != DUAL_TREE_CHROMA | | !intra_mip_flag[ x0 ][ y0 ] | |
      Min( lfnstWidth, lfnstHeight ) >= 16 ) &&
   Max( cbWidth, cbHeight ) <= MaxTbSizeY) {
if( ( IntraSubPartitionsSplitType != ISP_NO_SPLIT | | LfnstDcOnly = = 0 )
&&
      LfnstZeroOutSigCoeffFlag = = 1 )
      lfnst_idx                                                               ae(v)
}
```

In VVC Draft 7, the LFNST and MTS indexes are coded at the end of the CU, which introduces the latency and buffer issues that a decoder needs to buffer all the coefficients of all three color components before receiving the MTS and LFNST indexes. In order to reduce the latency and buffer issues, it is proposed to send the MTS and/or LFNST enabling flag or index (e.g. 0 for disable, 1 and 2 for enable. 1 and 2 means using different primary transform or different LFNST matrix) at the end of the first TB in a CU or the end of the one or more TBs of the first color component, or at the end of the first non-zero TB (and non-transform skip TB) in a CU or the end of the one or more TBs of the first color component (and non-transform skip TB).

In another embodiment, it is proposed to send the MTS and/or LFNST enabling flag or index at the end of the first non-zero TB (and non-transform skip TB) in a CU or the end of the one or more TBs of the first color component (and non-transform skip TB). In one example, it can be applied to single tree only. In a single tree, the LFNST and MTS indexes are signaled/parsed after the luma TB (or before the chroma TBs). If the single tree and ISP are applied, the LFNST and MTS indexes are signaled/parsed after the last luma TB (or before the chroma TBs). For example, the subTuIndex can be used. When the subTuIndex is equal to NumIntraSubPartitions−1, the current TB is luma TB, and the current tree type is single tree, the MTS and LFNST indexes are signaled/parsed (if one or more conditions are satisfied).

In another embodiment, it is proposed to send the MTS and/or LFNST enabling flag or index at the end of the one or more luma TBs in a CU (or before the chroma TBs) in the single tree case; while in the luma dual tree, the MTS and/or LFNST index is signaled/parsed at the end of the one or more luma TBs in a CU (or at the end of the CU); while in the chroma dual tree, the MTS and/or LFNST index is signaled/parsed after the end of the Cr TBs in a CU (or said at the end of the CU). If the single tree and ISP are applied, the LFNST and MTS indexes are signaled/parsed after the last luma TB (or before the chroma TBs). For example, the subTuIndex can be used. When the subTuIndex is equal to NumIntraSubPartitions −1, the current TB is luma TB and the current tree type is single tree, the MTS and LFNST indexes are signaled/parsed (if one or more conditions are satisfied).

In another embodiment, the MTS and/or LFNST enabling flag or index is signaled/parsed at the first TB (e.g. at the end of the first TB) when ISP mode is used. The proposed method can only be applied to single tree (e.g. still signal/parse the MTS/LFNST index at the end of the CU in luma dual tree or chroma dual tree).

In the above mentioned method, the MTS index can be signaled/parsed after the LFNST index. If the LFNST is used (e.g. LFNST index is not 0), the MTS index is inferred as 0. In another embodiment, the LFNST can be signaled/parsed after the MTS index signaling/parsing. If the MTS is used (e.g. MTS index is not 0), the LFNST index is inferred as 0.

Any above-proposed methods can be combined.

Any variances of above can be implicitly decided with the block width or block height or block area, or explicitly decided by a flag signaled/parsed at CU, CTU, slice, tile, tile group, SPS, PPS, or picture level. "Block" in this invention can means TU/TB/CU/CB/PU/PB.

Any of the foregoing proposed methods can be implemented in encoders and/or decoders. For example, any of the proposed methods can be implemented in an inter/intra/transform coding module of an encoder, a motion compensation module, a merge candidate derivation module of a decoder. Alternatively, any of the proposed methods can be implemented as a circuit coupled to the inter/intra/transform coding module of an encoder and/or motion compensation module, a merge candidate derivation module of the decoder.

Figure 3:
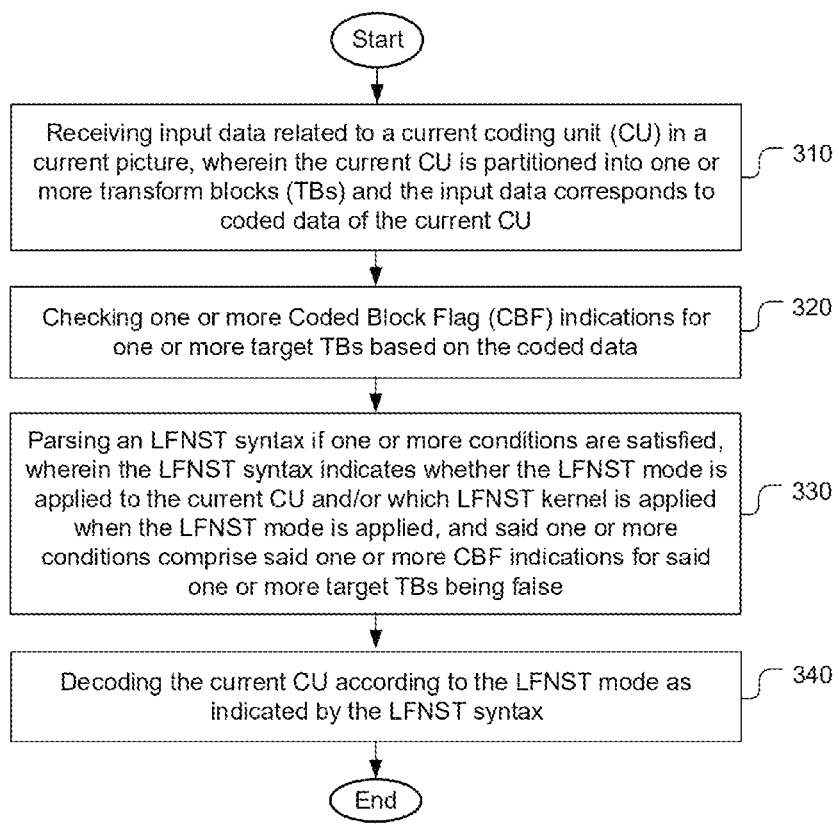
FIG. 3 illustrates a flowchart of an exemplary decoding system incorporating LFNST parsing according to an embodiment of the present invention.

The decoding process incorporating an embodiment of the present invention can be understood based on the disclosure described above. For the decoding process for a system incorporating LFNST, the input data are coded data including a CU being decoded. The decoding process then checks the CBF indications based on the coded data. An LFNST syntax is parsed according to the checking result. The CU is then decoded according to the LFNST syntax. FIG. 3 illustrates a flowchart of an exemplary decoding system incorporating LFNST (low-frequency non-separable transform) parsing according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart.

As shown in FIG. 3, input data related to a current coding unit (CU) in a current picture are received in step 310, where the current CU is partitioned into one or more transform blocks (TBs) and the input data corresponds to coded data of the current CU. One or more Coded Block Flag (CBF) indications for one or more target TBs are checked based on the coded data in step 320. An LFNST syntax is parsed if one or more conditions are satisfied in step 330, wherein the LFNST syntax indicates whether the LFNST mode is applied to the current CU and/or which LFNST kernel is applied when the LFNST mode is applied, and said one or more conditions comprise said one or more target TBs being false. The current CU is decoded according to the LFNST mode as indicated by the LFNST syntax in step 340.

The encoding process incorporating an embodiment of the present invention can be understood based on the disclosure described above. For the encoding process for a system incorporating LFNST, the input data for LFNST are primary transformed data. The encoding process then applies LFNST based on a LFNST kernel to derive temporary output data. For example, if the checking is passed, the LFNST syntax is signaled. In another example, if the checking is not passed (and TS checking is not passed, either), the LFNST syntax is forced to be zero. An LFNST syntax is the determined and signaled according to the checking result. The current CU is then encoded according to the determined LFNST syntax.

Figure 4:
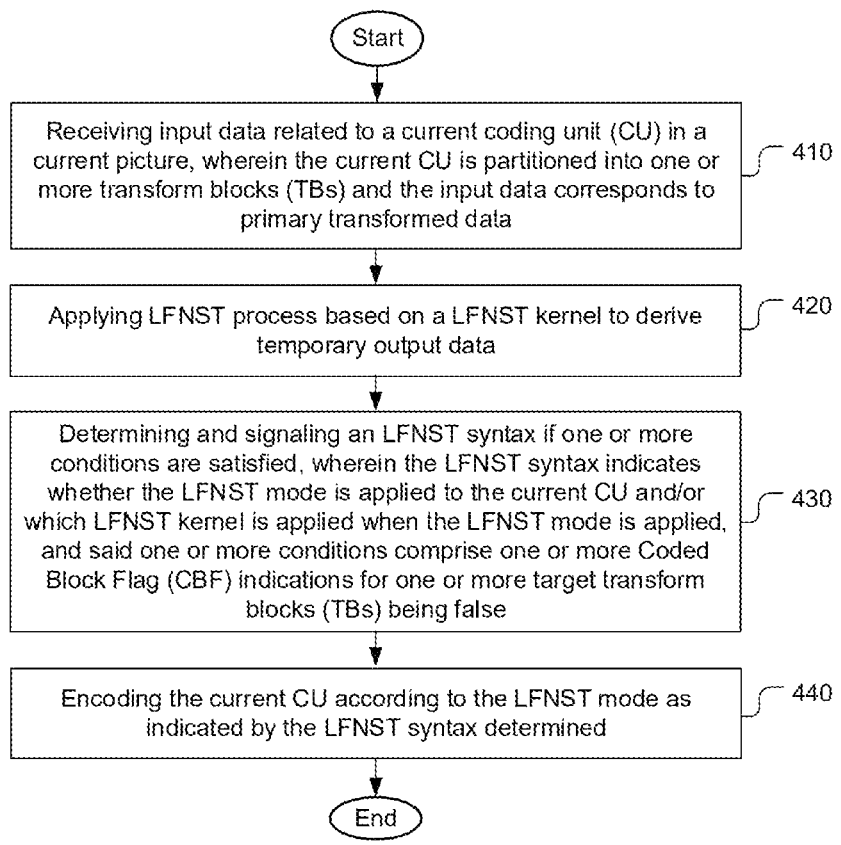
FIG. 4 illustrates a flowchart of an exemplary encoding system incorporating LFNST parsing according to an embodiment of the present invention.

FIG. 4 illustrates a flowchart of an exemplary encoding system incorporating LFNST (low-frequency non-separable transform) parsing according to an embodiment of the present invention. As shown in FIG. 4, input data related to a current coding unit (CU) in a current picture are received in step 410, wherein the current CU is partitioned into one or more transform blocks (TBs) and the input data corresponds to primary transformed data. The LFNST process is applied based on a LFNST kernel to derive temporary output data in step 420. An LFNST syntax is determined and signaled if one or more conditions are satisfied in step 430, wherein the LFNST syntax indicates whether the LFNST mode is applied to the current CU and/or which LFNST kernel is applied when the LFNST mode is applied, and said one or more conditions comprise one or more Coded Block Flag (CBF) indications for one or more target transform blocks (TBs) being false. The current CU is encoded according to the LFNST mode as indicated by the LFNST syntax determined in step 440.

The flowchart shown is intended to illustrate an example of video encoding/decoding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention. Embodiment of the present invention as described above may be implemented in a video encoder and a video decoder. The components of the video encoder and video decoder may be implemented by hardware components, one or more processors configured to execute program instructions stored in a memory, or a combination of hardware and processor. For example, a processor executes program instructions to control receiving of input data associated with a video sequence including a current block in a current picture. The processor is equipped with a single or multiple processing cores. In some examples, the processor executes program instructions to perform functions in some components in the encoder and the decoder, and the memory electrically coupled with the processor is used to store the program instructions, information corresponding to the reconstructed images of blocks, and/or intermediate data during the encoding or decoding process. The memory in some embodiment includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable medium listed above.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for decoding a video sequence, wherein a low frequency non-separable transform (LFNST) mode is supported, the method comprising:

receiving input data related to a current coding unit (CU) in a current picture, wherein the current CU is partitioned into one or more transform blocks (TBs) and the input data corresponds to coded data of the current CU;

checking one or more Coded Block Flag (CBF) indications for one or more target TBs based on the coded data;

parsing an LFNST syntax when one or more conditions are satisfied, wherein the LFNST syntax indicates whether the LFNST mode is applied to the current CU and/or which LFNST kernel is applied when the LFNST mode is applied, and said one or more conditions comprise said one or more CBF indications for said one or more target TBs being false; and decoding the current CU according to the LFNST mode as indicated by the LFNST syntax.

2. The method of claim 1, wherein said one or more target TBs correspond to one or more TBs with Transform Skip (TS) flags not equal to 0.

3. The method of claim 1, wherein, in a luma splitting tree, the current CU corresponds to a luma coding block, and said one or more target TBs correspond to one or more luma TBs.

4. The method of claim 1, wherein, in a chroma splitting tree, the current CU corresponds to one or more chroma coding blocks, and said one or more target TBs correspond to one or more chroma TBs.

5. The method of claim 1, in a single splitting tree, the current CU corresponds to one luma coding block and one or more chroma coding blocks, and said one or more target TBs correspond to one or more luma TBs and one or more chroma TBs.

6. The method of claim 1, wherein said one or more target TBs correspond to a predefined TB for each coding block in the current CU.

7. The method of claim 6, wherein the predefined TB corresponds to the first TB for each coding block in the current CU.

8. The method of claim 1, wherein if all of said one or more CBF indications for said one or more target TBs are false, the LFNST mode is allowed for the current CU.

9. The method of claim 1, wherein if all of said one or more CBF indications for said one or more target TBs are false and said one or more target TBs indicates one or more TBs having Transform Skip (TS) flags not equal to 0, the LFNST mode is allowed for the current CU.

10. The method of claim 1, wherein if any one of said one or more CBF indications for said one or more target TBs with Transform Skip (TS) flags not equal to 0 is true, the LFNST mode is disallowed for the current CU.

11. An apparatus for decoding a video sequence, wherein a Low-Frequency Non-Separable Transform (LFNST) mode is supported, the apparatus comprising one or more electronic circuits or processors arranged to:

receive input data related to a current coding unit (CU) in a current picture, wherein the current CU is partitioned into one or more transform blocks (TBs) and the input data corresponds to coded data of the current CU;

check one or more Coded Block Flag (CBF) indications for one or more target TBs based on the coded data;

parse an LFNST syntax when one or more conditions are satisfied, wherein the LFNST syntax indicates whether the LFNST mode is applied to the current CU and/or which LFNST kernel is applied when the LFNST mode is applied, and said one or more conditions comprise said one or more CBF indications for said one or more target TBs being false; and decode the current CU according to the LFNST mode as indicated by the LFNST syntax.

12. A method for encoding a video sequence, wherein a low frequency non-separable transform (LFNST) mode is supported, the method comprising:

receiving input data related to a current coding unit (CU) in a current picture, wherein the current CU is partitioned into one or more transform blocks (TBs) and the input data corresponds to primary transformed data;

applying LFNST process based on a LFNST kernel to derive temporary output data;

determining and signaling an LFNST syntax when one or more conditions are satisfied, wherein the LFNST syntax indicates whether the LFNST mode is applied to the current CU and/or which LFNST kernel is applied when the LFNST mode is applied, and said one or more conditions comprise one or more Coded Block Flag (CBF) indications for one or more target transform blocks (TBs) being false; and encoding the current CU according to the LFNST mode as indicated by the LFNST syntax determined.

13. An apparatus for encoding a video sequence, wherein a Low-Frequency Non-Separable Transform (LFNST) mode is supported, the apparatus comprising one or more electronic circuits or processors arranged to:

receive input data related to a current coding unit (CU) in a current picture, wherein the current CU is partitioned into one or more transform blocks (TBs) and the input data corresponds to primary transformed data;

apply LFNST process based on a LFNST kernel to derive temporary output data;

determine and signal an LFNST syntax when one or more conditions are satisfied, wherein the LFNST syntax indicates whether the LFNST mode is applied to the current CU and/or which LFNST kernel is applied when the LFNST mode is applied, and said one or more conditions comprise one or more Coded Block Flag (CBF) indications for one or more target transform blocks (TBs) being false; and encode the current CU according to the LFNST mode as indicated by the LFNST syntax determined.

14. The method of claim 1, wherein the CBF indications for the one or more target TBs depend on coded block flags for the one or more target TBs.

* * * * *